US008335782B2

(12) United States Patent
Nishizawa et al.

(10) Patent No.: US 8,335,782 B2
(45) Date of Patent: Dec. 18, 2012

(54) RANKING QUERY PROCESSING METHOD FOR STREAM DATA AND STREAM DATA PROCESSING SYSTEM HAVING RANKING QUERY PROCESSING MECHANISM

(75) Inventors: Itaru Nishizawa, Koganei (JP); Tsuneyuki Imaki, Kawasaki (JP); Toshihiko Kashiyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 681 days.

(21) Appl. No.: 12/222,413

(22) Filed: Aug. 8, 2008

(65) Prior Publication Data
US 2009/0112853 A1 Apr. 30, 2009

(30) Foreign Application Priority Data

Oct. 29, 2007 (JP) ................................ 2007-279786
Jul. 3, 2008 (JP) ................................ 2008-174086

(51) Int. Cl.
*G06F 7/00* (2006.01)
*G06F 17/30* (2006.01)
(52) U.S. Cl. ...................................... 707/718; 707/723
(58) Field of Classification Search ................. 707/731, 707/718, 999.005, 708, 723
See application file for complete search history.

(56) References Cited

U.S. PATENT DOCUMENTS

| 5,495,600 | A | | 2/1996 | Terry et al. |
| 5,915,249 | A | * | 6/1999 | Spencer ......................... 707/742 |
| 6,947,934 | B1 | * | 9/2005 | Chen et al. ............. 707/999.007 |
| 6,986,019 | B1 | * | 1/2006 | Bagashev et al. ..... 711/E12.019 |
| 7,251,648 | B2 | | 7/2007 | Chaudhuri et al. |
| 7,493,346 | B2 | * | 2/2009 | Chi et al. .................. 707/999.2 |
| 7,698,267 | B2 | * | 4/2010 | Papakonstantinou et al. ...................... 707/999.005 |
| 7,761,528 | B2 | * | 7/2010 | Shen et al. ............. 707/999.004 |
| 2006/0100969 | A1 | * | 5/2006 | Wang et al. .................... 705/400 |
| 2006/0106509 | A1 | * | 5/2006 | Robb et al. ....................... 701/29 |
| 2006/0259457 | A1 | * | 11/2006 | Muras et al. ............. 707/999.02 |
| 2006/0277230 | A1 | * | 12/2006 | Nishizawa et al. .... 707/999.204 |

FOREIGN PATENT DOCUMENTS

JP 2006-338432 6/2005

OTHER PUBLICATIONS

Golab, Lukasz. Sliding Window Query Processing over Data Streams (Ph.D. Dissertation), Aug. 2006, University of Waterloo. pp. 2-3, 18-19, 23-24, 26-27, 42, 44, 87-89, 98.*
Motwani, Rajeev, et al., "Query Processing, Resouce Management, and Approximation in a Data Stream Management System", Proceedings of the 2003 CIDR Conference, Stanford University, db.stanford.edu/stream, 2003.
Date, C.J., et al., "A Guide to The SQL Standard: A User's Guide to the Standard Database Language SQL", Addison-Wesley, Pearson Education, Computer Science/Database, Fourth Edition, 2000, ISBN 0-201-96426-0, Contents pp. xv-xxii, An Overview of SQL pp. 9-26.

* cited by examiner

*Primary Examiner* — Apu Mofiz
*Assistant Examiner* — Bryan Walker
(74) *Attorney, Agent, or Firm* — Stites & Harbison, PLLC; Juan Carlos A. Marquez, Esq

(57) ABSTRACT

A mechanism for managing ranking information using a sign of a stream tuple generated when stream data is inserted into, or deleted from, a window is provided. A mechanism for generating only the differential information of ranking calculation results, a mechanism for adding ranking information according to a request, an interface for generating and outputting all ranking information from the differential information, a mechanism for generating all ranking calculation results, and an interface for using these mechanisms are provided.

12 Claims, 17 Drawing Sheets

```
IDSTREAM (SELECT s.id, s.val
   FROM s [Partition By s.id Rows 1]
   LIMIT 3 By s.val DESC);
```
301

```
RSTREAM (SELECT s.id, s.val
   FROM s [Partition By s.id Rows 1]
   LIMIT 3 By s.val DESC);
```
302

FIG. 6A

```
IDSTREAM (SELECT RANKING AS rank, s.id, s.val
    FROM s [Partition By s.id Rows 1]
    LIMIT 3 By s.val DESC);
```
601

FIG. 6B

```
RSTREAM (SELECT RANKING AS rank, s.id, s.val
    FROM s [Partition By s.id Rows 1]
    LIMIT 3 By s.val DESC);
```
602

```
IDSTREAM (SELECT s.id, s.val                    ~1101
    FROM s [Partition By s.id Rows 1]
    LIMIT 3 OFFSET 10 By s.val ASC);
```

```
SELECT COUNT (*)                                ~1201
    FROM Requests S [Range 1 Day Preceding]
    WHERE S.domain = 'stanford.edu'
```

RANKING QUERY PROCESSING METHOD FOR STREAM DATA AND STREAM DATA PROCESSING SYSTEM HAVING RANKING QUERY PROCESSING MECHANISM

CLAIM OF PRIORITY

The present application claims priority from Japanese patent application JP 2007-279786 filed on Oct. 29, 2007, and JP 2008-174086 filed on Jul. 3, 2008, the contents of which are hereby incorporated by reference into this application.

FIELD OF THE INVENTION

The present invention relates to a ranking calculation method in a stream data processing system that processes stream data arriving continuously, in real time, and a stream data processing system using the calculation method.

BACKGROUND OF THE INVENTION

In the past, a database management system (hereinafter, referred to as a DBMS) is located in the central of the business information system. The DBMS stores data to be processed in a storage and performs highly reliable processing represented by transaction processing on the stored data. There is high demand for a data processing system for processing a large volume of data arriving continuously, in real time. For example, in the case of a financial application supporting stock transactions, the ability to quickly respond to a change in stock prices is of considerable importance. In a system that first stores stock data in a storage and retrieves the stored data as in a DBMS of the related art, an operation of storing and subsequently retrieving data may not keep up with the speed of stock price changes, and thus trading opportunities may be lost. For example, U.S. Pat. No. 5,495,600 discloses a mechanism for periodically executing stored queries. It, however, is important for the mechanism to immediately execute the queries upon arrival of data such as stock prices. That is, since a discrepancy between a query execution period and data processing timing is not allowable, it is difficult to apply the mechanism to real-time data processing represented by the above-described financial application. An approach for individually creating various real-time applications using a programming language represented by Java® is time consuming and costly, is unable to make rapid adaptation to changes in business practices that uses the applications, and requires a general-purpose real-time data processing mechanism.

As a data processing system suitable for such real time data processing, a stream data processing system has been proposed. For example, a stream data processing system STREAM is disclosed in "Query Processing, Resource Management, and Approximation in a Data Stream Management System" written by R. Motwani, J. Widom, A. Arasu, B. Babcock, S. Babu, M. Datar, G. Manku, C. Olston, J. Rosenstein, and R. Varma, in Proc. of the 2003 Conf. on Innovative Data Systems Research (CIDR), January 2003.

Unlike a DBMS of the related art, the stream data processing system first registers a query and continuously executes the query upon arrival of data. Here, the stream data is not single large, logically continuous data like a video stream, but relatively small and logically independent large-volume time-series data, such as stock price transfer data in a financial application, POS data in retail business, probe car data in a traffic information system, error log data in computer system management, sensing data generated from a ubiquitous device, such as a sensor or an RFID, and the like. Since the stream data continuously arrives at the system, process initiation after waiting for an end of the data makes real-time processing impossible. Data arriving at the system needs to be processed in order of arrival without being affected by the load of data processing. The STREAM introduces a concept called a sliding window (hereinafter, referred to as a window) to process the stream data continuously arriving at the system, in real time, while partially cutting out the stream data with a designated time width such as the last 10 minutes, or a designated a number of records such as the last 1,000 records. A typical example of a descriptive language for a query including a window designation may include Continuous Query Language (CQL) disclosed in the above-described document written by R. Motwani et al. CQL has an extension designating the window by using square brackets following a stream name in a FROM phrase of Structured Query Language (SQL), which is widely used by the DBMS. Details of SQL are written in "A Guide to SQL Standard (4th Edition)" written by C. J. Date, Hugh Darwen, Addison-Wesley Professional; 4 Edition (Nov. 8, 1996), ISBN 0201964260.

Query 1201 in FIG. 12 is an example of a query of CQL shown in Chapter 2.1 of the above-described document written by R. Motwani, et al. In the query, a web proxy server calculates the total number of accesses per day, measured back from the present time, from a domain stanford.edu. "Requests" are web access data continuously arriving at the web proxy server and are not static data such as a table used by a DBMS of the related art but seamless stream data. Therefore, the total number of accesses cannot be calculated without designating a certain part of stream data as a target by a window designation "[Range 1 Day Preceding]". Stream data cut by the window is held in a memory and used for query processing. Representative window designation methods include a Range window for designating a window width in terms of time and a Row window for designating a window width in terms of the number of data. For example, when [Range 10 minutes] is set using the Range window, the last 10 minutes are set as a target for query processing. When [Rows 10] is set using the Row window, the last 10 records are set as a target for query processing.

It is expected that the stream data processing system will be applied to financial applications, sales monitoring of retail businesses, traffic information systems, and applications requiring real-time processing by computer system management. Hereinafter, applications requiring real-time processing are referred to as real-time applications. In a real-time application, a ranking calculation is crucial to extract important information from huge amounts of data. For example, in a financial application, ranking information about certain stocks that exhibit large changes in price or transaction amount is important. In sales monitoring of retail businesses, ranking information focused on sales quantities and rankings of various shops and products is needed. In traffic information systems, ranking information focused on areas of high traffic and congestion is needed. Also in computer system management, ranking information for adding the priority of a management target such as the number of serious errors, the number of accesses, etc. is essential.

When target data for the ranking calculation is static, that is, data to be ranked is not changed, data may be sorted by a key for ranking (hereinafter, referred to as a ranking key), and data may be output according to ranks of sorting results. For example, when ranking information of the top ten best selling stocks stored in a database is calculated, the sales of each stock for the day are counted and the results that sales of each stock are counted as a ranking key are sorted such that the top ten cases may be selected and output. A method of automatically determining a ranking key (sales in the above-described example) from a query input by a user is disclosed in U.S. Pat. No. 7,251,648. A method of reducing the cost of surplus data processing by adding a condition upon query processing when only first n rows are designated to be output by a query of the DBMS is disclosed in U.S. Laid-Open Patent Application No. 2006/0259457. In the above-described SQL, a "GROUP BY" phrase for classifying stocks, an aggregate function SUM for calculating total sales, and an "ORDER BY" phrase for executing sorting based on a count value are provided. By combining these, ranking calculation results may be generated in descending order (or ascending order) of sales from stock transaction data stored in a database on a daily basis.

However, since new data (stream data) continuously arrives in the above-described real-time application, it is difficult for the data to be static. When a real-time application dedicated ranking calculation is carried out using the DBMS, it is necessary to store data in the DBMS whenever stream data arrives and process the above-described classification, counting, and sorting in the DBMS. This processing is costly since it is basically necessary to access large volumes of data in the database. Thus, when stream data generated from the real-time application arrives at high speed, that is, when a time interval in which the stream data arrives is short, it is impossible to complete processing within the time interval and thus is difficult to perform the real-time application dedicated ranking calculation using the DBMS.

As described above, in the stream data processing system, a target to be processed is processed by cutting the target from infinitely continuous stream data by the above-described window. Since only data in the window is targeted for processing, other data extracted from the window needs to be deleted from the data targeted for ranking processing. The timing of extracting data from the window differs according to whether the window designation method is based on time (the above-described Range window) or number of records (the above-described Row window). If the number of records is designated, the timing of extracting data targeted for processing from the window is not determined immediately when the data is input to the window, but rather by subsequent stream data. On the other hand, if there is a time designation, the timing of extracting data targeted for processing from the window may be determined immediately when the data is input to the window, but deletion timing (timing of extraction from the window) is not synchronized with subsequent data.

Whenever the stream data is inserted into the window in the ranking calculation, the consistency of ranking information needs to be maintained by executing the ranking calculation. In addition, even when data from the window disappears, the consistency of ranking information also needs to be maintained. Specifically, when the window is designated by time, the ranking calculation needs to be executed in consideration of the disappearance timing of data from the window, not in synchronization with arrival of subsequent data.

For processing efficiency, the ranking calculation must conform to the constraint of real-time processing, an important purpose of the stream data processing system. Since the stream data processing system is based on general-purpose data processing, it is necessary to provide a general-purpose interface and processing mechanism to realize processing by the interface that respond to requests of applications to pass only difference information of ranking calculation results, to pass entire ranking calculation results, and to include rank information in the ranking calculation results. So far, no ranking calculation method dedicated for a stream data processing system capable of meeting the above needs has been implemented.

SUMMARY OF THE INVENTION

When a stream data processing system is used to implement a ranking calculation required in a real-time application, it is necessary to insert stream data into a window and perform consistent ranking processing even when the stream data disappears. To obtain real-time ranking processing results, it is necessary to process a ranking update efficiently whenever internal data of a target window to be processed changes.

An object of the present invention is to provide a ranking processing method and system that can compute a ranking update efficiently whenever internal data of a target window to be processed changes, and that can maintain consistency of processing results.

A summary of a representative embodiment of the invention disclosed in this application is as follows. That is, a representative embodiment adopts stream data processing for generating or updating a ranking in a range of stream tuples present in a lifetime, and archiving in a buffer in a range of stream tuples present in the lifetime, beyond an output-designated rank range, whenever stream data is inserted into, or deleted from, a window, that is, whenever a lifetime of a certain stream tuple starts or ends.

In terms of only an output of ranking information at a certain time, it obviously seems to be sufficient if the ranking information is archived in the range of stream tuples of output-designated ranks. However, whenever stream data is inserted into, or deleted from, a window due to reception of a new stream tuple, a ranking itself changes. Accordingly, to continuously execute a consistent ranking calculation, the ranking information needs to be updated every insertion or deletion and a stream tuple in a range of stream tuples present in the lifetime beyond the output-designated rank range and its ranking information need to be archived.

Furthermore, the representative embodiment is characterized in that it has a two-step processing mechanism of a window manager for inserting a received stream tuple as a target to be processed for the ranking calculation into a window, determining a lifetime of the stream tuple within the window, and deleting the stream tuple from the window when the lifetime ends, and a ranking processing module for executing the ranking calculation. The window manager provides the ranking processing module with window differential information indicating an ever-changing part rather than information of all stream tuples within the window, and the ranking processing module executes the ranking update using the provided window differential information and information archived by carrying out a previous ranking calculation. Specifically, a stream tuple to which a sign is added to indicate that a corresponding stream tuple is inserted into the window, and a stream tuple to which a sign is added to indicate that a corresponding stream tuple is deleted from the window, are delivered to the ranking processing module as the window differential information. The ranking processing module updates the ranking information based on the difference information, archives the ranking information in a ranking information holding buffer, and outputs ranking output information in a designated format.

In the stream data processing system for processing large volumes of data arriving continuously in real time using the present invention, a high-speed, high-efficiency ranking calculation can be implemented by maintaining consistency with input stream data. By applying this ranking calculation method, a data processing base commonly available in real-time applications can be provided.

BRIEF DESCRIPTION OF THE DRAWINGS

FIGS. 6A and 6B are an example of a query including a ranking designation (including a rank output designation) in the present invention;

DETAILED DESCRIPTION OF THE PREFERRED EMBODIMENTS

Figure 1:
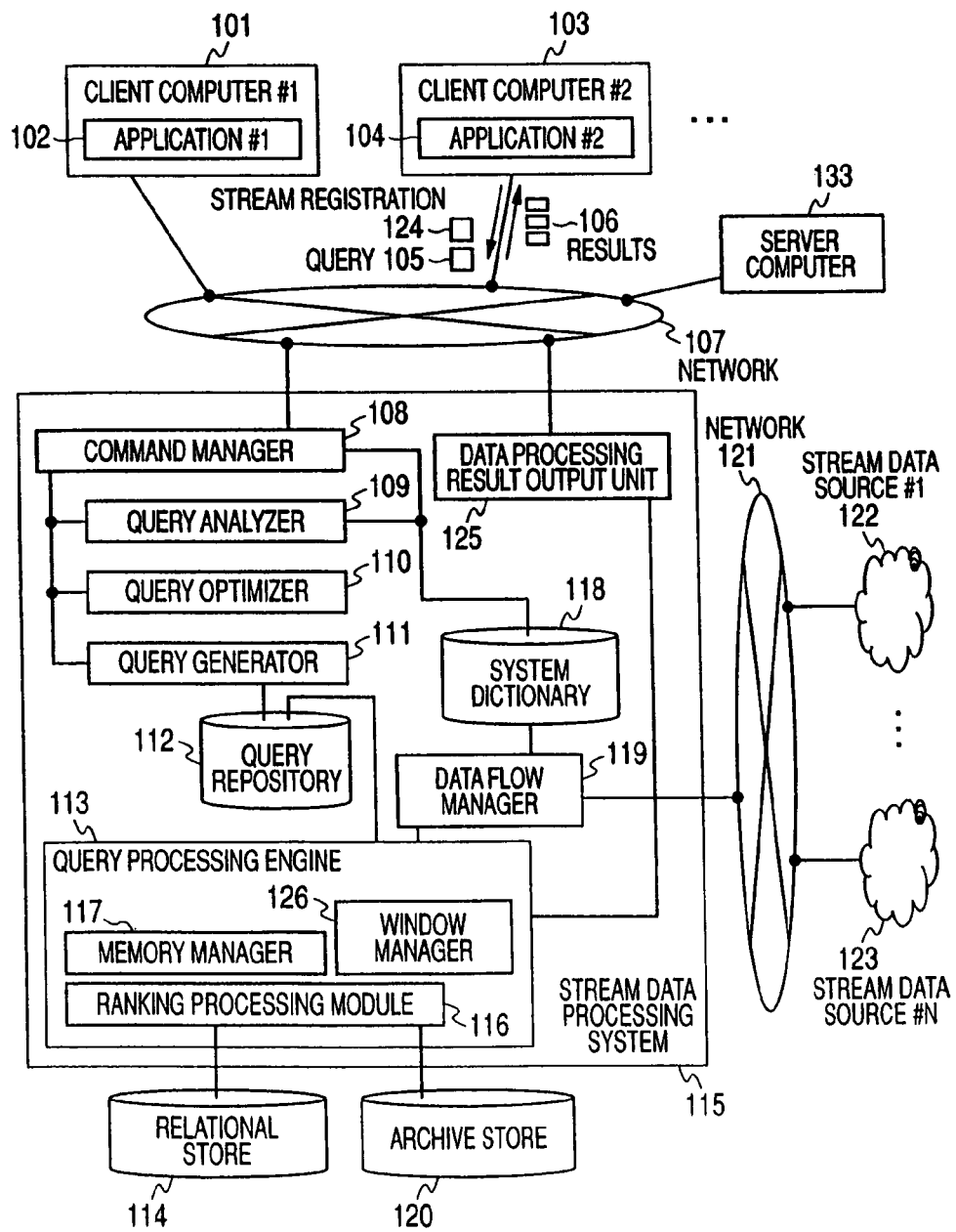
FIG. 1 is a diagram showing a structure of a stream data processing system in the present invention.
Figure 16:
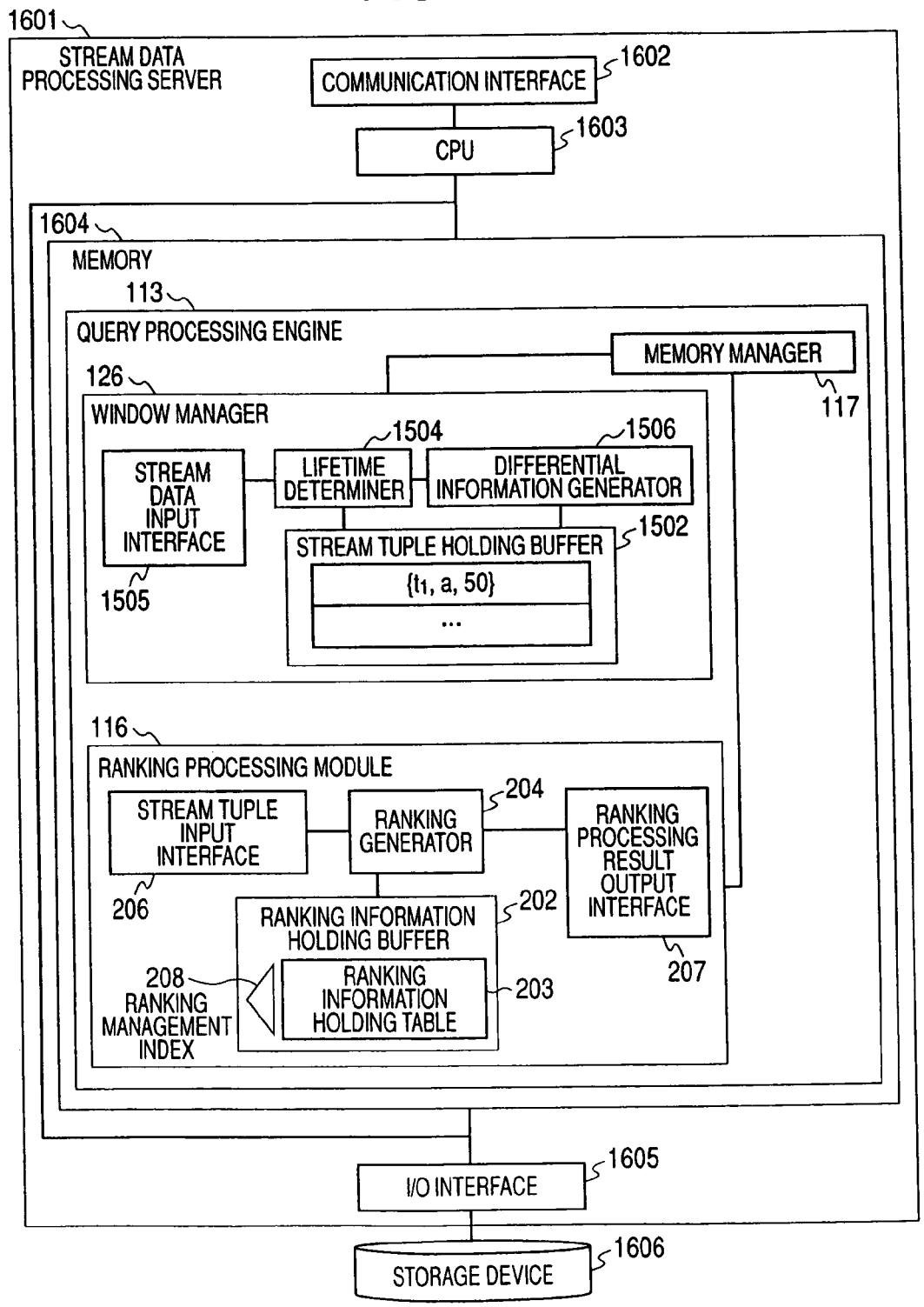
FIG. 16 is a diagram showing an example of implementation of a query processing engine on a computer in the present invention.

FIGS. 1 and 16 show preferred embodiments of a stream data processing system of the present invention. A client computer 101 for executing application #1 102 and a client computer 103 for executing application #2 104 are connected to a stream data processing system 115 via a network 107. The network 107 may be a local area network (LAN) using, for example, an Ethernet or an optical fiber, or a wide area network (WAN), such as the Internet having a lower rate than the LAN. The client computer may be any computer system, including a personal computer or a blade computer system.

In this embodiment, a computer in which the stream data processing system operates is referred to as a stream data processing server. Referring to FIG. 16, a stream data processing server 1601 may be a computer including a communication interface 1602 such as an Ethernet adaptor, a CPU 1603, a memory 1604, and an I/O interface 1605, or may be any computer system, including a blade computer system or a PC server. The stream data processing server accesses the client computers and data sources described later via the communication interface. The stream data processing server can use a storage device 1606 connected thereto to store a stream data processing result, an intermediate processing result, and setting data required for system operation in a nonvolatile storage. The storage device 1606 is connected directly via an I/O interface of the stream data processing server or networked via the communication interface.

The stream data processing system 115 operates on the stream data processing server 1601. Primary components of the stream data processing system are shown in FIG. 1. The application first registers a query in the stream data processing system (105). The registered query is stored in a query repository 112. Preferred embodiments of a process of registering a query, a method of storing data in a stream data processing system, a data storage format, a method of interpreting a received query, a method of optimizing the query, a method of registering the query in a system, a method of registering a stream in a stream data processing system, and a method of holding data in a system are disclosed in JP-A-2006-338432, entitled "Method of Processing Query in Stream Data Processing System". The registered query may be hold in the memory 1604 of the stream data processing server or it may be stored in the storage device 1606 connected to the stream data processing server.

Large volumes of data arrive continuously from one or more stream data sources, for example, stream data source #1 122 to stream data source #N 123, to the stream data processing system via a network 121. These data are referred to as stream data. Preferred examples of the stream data include stock price transfer information in a financial application, POS data in retail business, probe car information in a traffic information system, error log data in computer system management, and the like. The stream data processing system feeds stream data received by a data flow manager 119 via the communication interface 1602 to a query processing engine 113.

As described above, the stream data processing system uses a window to process stream data as relatively small and logically independent, large-volume, time-series data that continuously arrive. In FIG. 1, a window manager 126 generates a stream tuple by applying a window calculation designated in the query to arriving stream data, and sets lifetime in the system of the stream tuple. A time when the stream data is inserted into the window corresponds to a start of the lifetime, and a time when the stream data is deleted from the window corresponds to an end of the lifetime.

Figure 15:
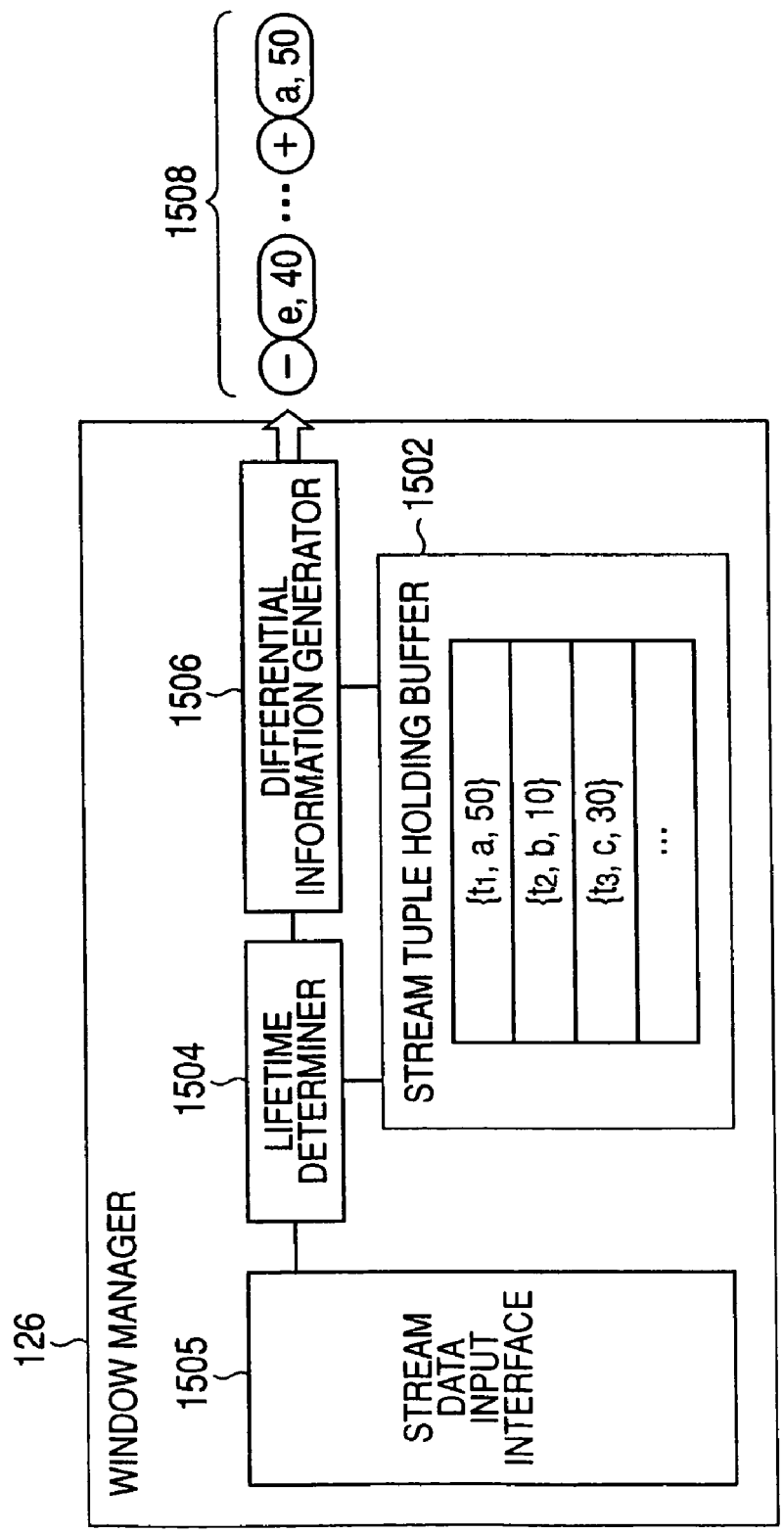
FIG. 15 is a diagram showing a structure of a window manager in the present invention.

A structure and operation of the window manager will now be described using FIG. 15. The window manager 126 includes a stream data input interface 1505, a stream tuple holding buffer 1502, a lifetime determiner 1504, and a differential information generator 1506. The stream data input interface stores a stream tuple, which is an element of the received stream data, in the stream tuple holding buffer 1502, and transfers stored data from the lifetime determiner 1504. The lifetime determiner 1504 determines the lifetime of each stream tuple through the window operation, and deletes a stream tuple whose lifetime ends from the stream holding buffer 1502. The differential information generator 1506 generates a plus tuple at a time when the stream tuple is stored in the stream tuple holding buffer, and outputs the same as the differential information (1508). Similarly, the differential information generator 1506 generates a minus tuple at a time when the stream tuple is deleted from the stream tuple holding buffer (a time when the lifetime of the stream tuple ends), and outputs the same as the differential information (1508).

As shown in FIG. 16, the stream tuple holding buffer 1502 is disposed on a memory assigned by the memory manager 117 in the query processing engine 113. The memory may be the memory 1604 on the stream data processing server 1601, the storage device 1606 connected to the stream data processing server according to performance and reliability requirements, or a memory on a server computer (block 133 in FIG. 1) networked with the stream data processing server and having the same computer resource as the stream data processing server.

Next, a structure of a ranking processing module will be described using FIG. 2. The ranking processing module 116 includes a stream tuple input interface 206, a ranking generator 204, a ranking information holding buffer 202, a ranking information holding table 203, a ranking management index 208, and a ranking processing result output interface 207. As shown in FIG. 16, the ranking processing module is disposed on the memory assigned by the memory manager 117 in the query processing engine 113. The memory may be the memory 1604 on the stream data processing server 1601, the storage device 1606 connected to the stream data processing server according to performance and reliability requirements, or the memory on the server computer (block 133 in FIG. 1) networked with the stream data processing server and having the same computer resource as the stream data processing server.

Figure 17:
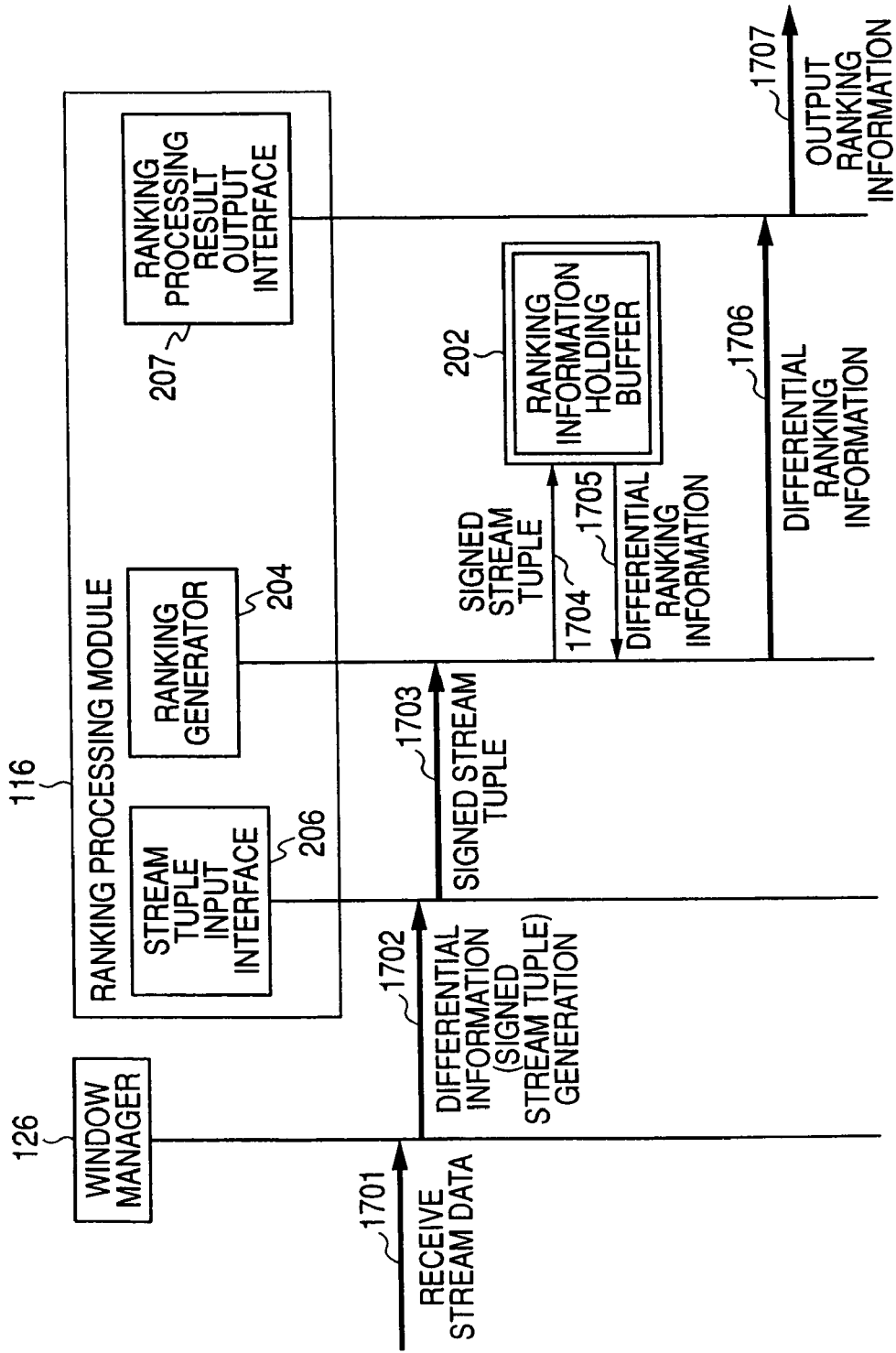
FIG. 17 is a sequence diagram showing a ranking calculation method in the present invention.
Figure 18:
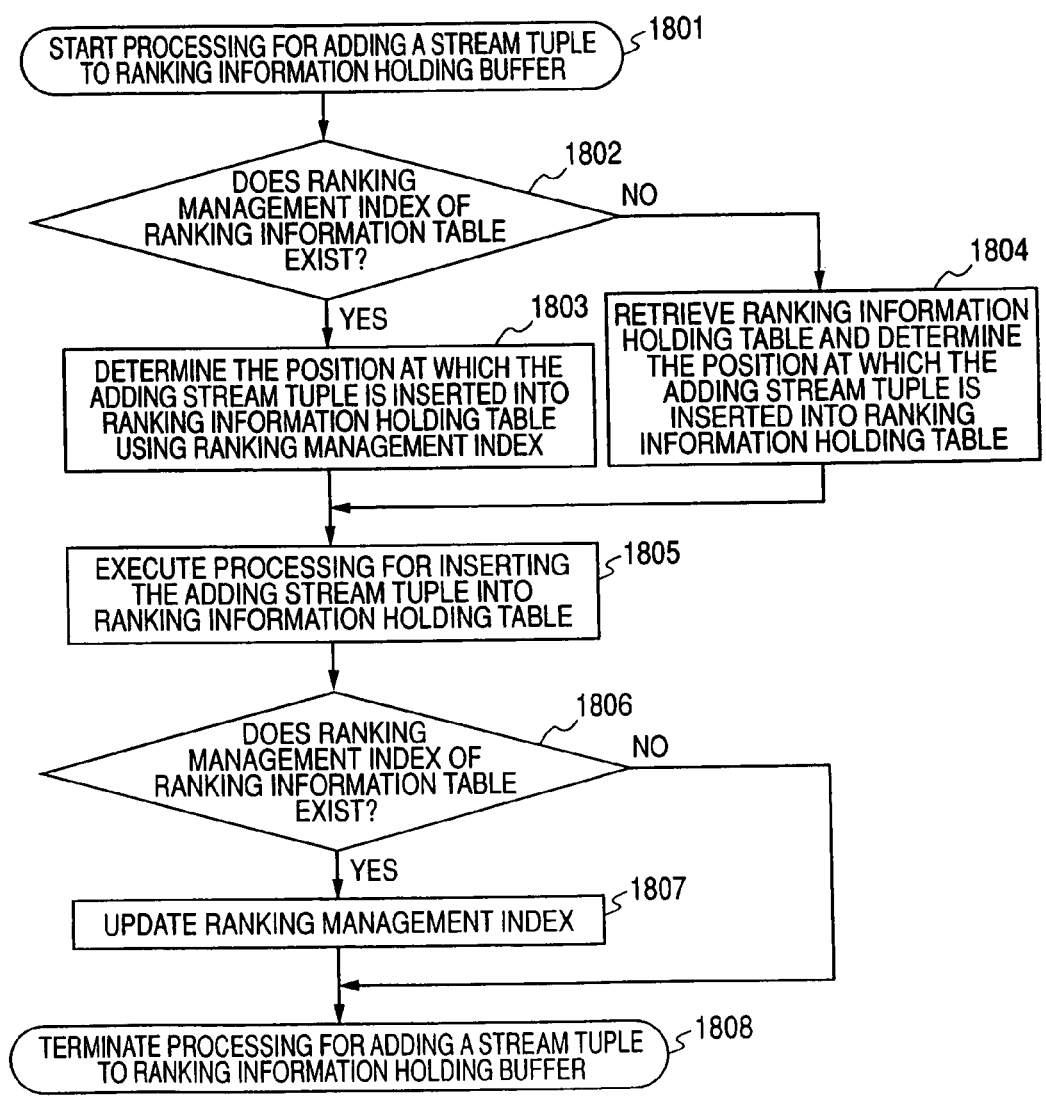
FIG. 18 is a flowchart showing a method of adding a stream tuple to the ranking information holding buffer in the present invention.

FIG. 17 shows a ranking information generation sequence in processing stream data according to the present invention. The window manager 126 receives stream data from an external data source (1701) and generates differential information (a signed stream tuple) (1702). In the ranking processing module 116, the stream tuple input interface 206 receives the differential information (the signed stream tuple) from the window manager and transmits the same to the ranking generator 204. The ranking generator adds the received signed stream tuple to a suitable position in the ranking buffer while referring to the ranking information holding buffer 202, or deletes ranking information from a suitable position in the ranking buffer, generates a difference in ranking information relative to a previous output (ranking differential information) (1705), and transmits the ranking differential information to the ranking processing result output interface 207 (1706). The ranking processing result output interface outputs the ranking information according to a data output format designated by the query.

A ranking calculation method of this embodiment will now be described in detail with respect to the query and the stream data. A query 301 shown in FIG. 3A is a query to instruct ranking processing without designating rank output (that is, output of a rank itself). A SELECT phrase in the first row has a set of s.id and s.val values as an output target, a FROM phrase in the second row has a stream s as an object, a Partition By phrase in the same second row is to hold the last one of each s.val value by grouping in the value s.id, and a LIMIT phrase in the third row is to output three s.val values in descending order of s.val. In the stream data processing system of this embodiment, a column as a ranking calculation target, a ranking direction (ascending/descending order), an output number for ranking calculation results, and whether to add rank information to the calculation results are designated by the previously input query. In the query 301, the LIMIT phrase of the third row is a ranking designation to output three s.val values in descending order of s.val value. An IDSTREAM phrase in the first row means that the query is made to output only differential information relative to the previous output.

A process when stream data is input in the stream data processing system in which the query 301 is set will be described using FIGS. 4 and 5A. When the query 301 is registered in the stream data processing system 115, query analysis, optimization, and generation are performed by, for example, the method disclosed in JP-A-2006-338432, and a query execution format is registered in the query processing engine. Since the query 301 includes ranking calculation designation, when the query in an execution format is executed, a ranking calculation is performed by the ranking processing module 116 in the query processing engine 113. As in the above-mentioned document written by R. Motwani et al., the query in the stream data processing system, after registered, continues to operate on the system, and a state of the query is changed each time the stream data is input to the system.

Figure 4:
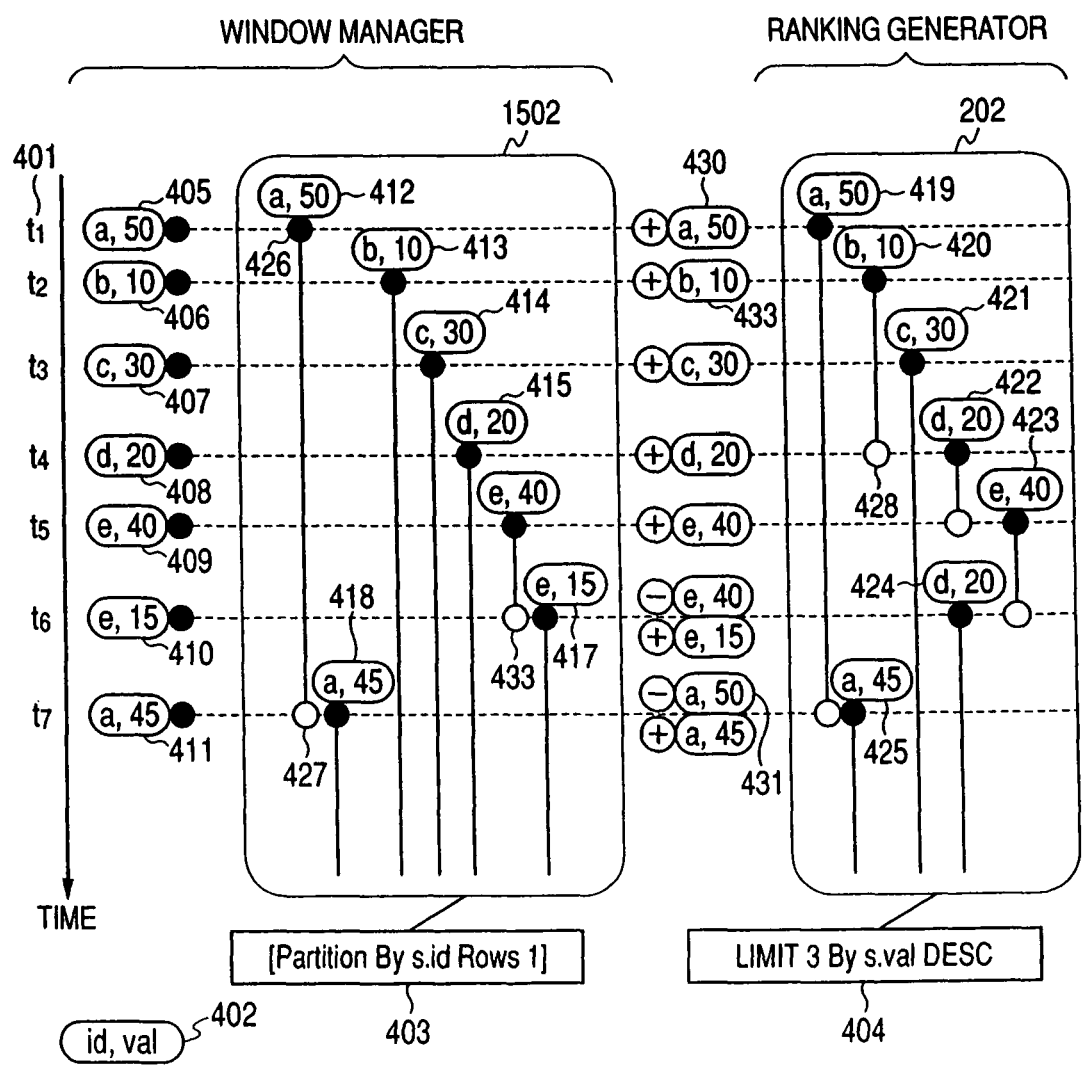
FIG. 4 is a diagram showing content of a ranking calculation (excluding a rank output designation) in the present invention.

It is assumed that stream data shown in FIG. 4 is input after the query 301 is registered. FIGS. 4 and 5A schematically show an example in which stream data are input to the system over time and processed by respective processing modules, where time is plotted on the vertical axis. As shown in examples 402 and 502, this embodiment assumes that the input stream data are in the format of {id, val} represented by an oval. t1 to t7 (401) indicate times when respective stream data 405 to 411 are input to the stream data processing system. For example, the stream data {a, 50} 405 and the stream data {b, 10} 406 are input to the stream data processing system at times t1 and t2, respectively. In FIG. 4, the horizontal axis indicates a position at which the input stream data is processed, and generated data. Further, a rounded rectangle 1502 at the left side of FIG. 4 indicates a state at each time of the stream holding buffer that stores results obtained as the window manager 126 applies a window calculation "[Partition By s.id Rows 1]" 403 to the stream data input to the system. A rounded rectangle 202 at the right also indicates a state at each time of the ranking information holding buffer that stores results obtained as the ranking generator 204 in the ranking processing module 116 applies a ranking calculation designation phrase "LIMIT 3 By s.val DESC" 404 to a stream tuple input from the window manager.

As described above, the window manager 126 generates the stream tuple by applying the window operation designated by the query to the input stream data, and sets a lifetime in the system of the stream tuple. In the example of FIG. 4, a start of the lifetime is represented by a black circle 426, and an end time thereof is represented by a white circle 427. According to the window operation, the lifetime of stream tuple {a, 50} 405 starts at time t1 and ends at time t7. In this embodiment, a tuple obtained by adding a sign indicating an increment to the stream data (hereinafter, referred to as a plus tuple) is generated in the system at the start of the lifetime of the stream data. Further, when the stream data is deleted from the window, a reference to a first output plus tuple is maintained, and a tuple with a sign representing a decrement (hereinafter, referred to as a minus tuple) is generated. This processing is performed by the window manager. For example, in the case of FIG. 4, a plus tuple 430 corresponding to the stream data {a, 50} 405 is generated at time t1, and a minus tuple 431 of the stream data is generated at time t7.

Following the window operation, subsequent query processing is performed on difference information caused by the plus tuple and the minus tuple at times when the plus tuple and the minus tuple arrive. Also, concepts of the plus tuple and the minus tuple themselves are disclosed in the above-described document written by R. Motwani et al.

Only the last s.id value of the input stream data is held in the query 301 by the window operation "[Partition By s.id Rows 1]" 403. Specifically, in FIG. 4, the stream data {a, 50} 405 is input at time t1, {b, 10} 406 at time t2, {c, 30} 407 at time t3, {d, 20} 408 at time t4, and {e, 40} 409 at time t5. Since the five stream data have different s.id values, the s.id values are held in the window. Next, when new stream data {e, 15} 410 is input at time t6, the stream data 409 having the s.id value of e held in the window so far is pushed out (deleted) from the window. Next, when {a, 45} 411 is input at time t7, {a, 50} 405 is deleted from the window, similarly. This is shown in a center portion 429 of FIG. 4. For example, stream data {a, 50} 412 is input at time t1 and then held in the window until {a, 45} 418 is input at time t7. In this case, the lifetime of the stream data {a, 50} is represented as ranging from t1 to t7 (excluding time t7). In the example of FIG. 4, the start of the lifetime is indicated by a black circle 426, the end thereof is indicated by a white circle 427, and the duration of the lifetime is indicated by a solid line. Similarly, the lifetime of {e, 40} 417 is from t5 to t6. Meanwhile, {b, 10} 413, {c, 30} 414, {d, 20} 415, {e, 15} 417, and {a, 45} 418 are indicated by solid lines because their end times are not determined at time t7.

The generation of the ranking information from the stream data having the lifetime as described above will be described in detail with reference to FIG. 4. A processing result by the ranking calculation designation phrase "LIMIT 3 By s.va1 DESC" 404 is shown at a right side 432 of FIG. 4. This ranking designation phrase is to extract three s.va1 values in descending order, as described above. The stream data {a, 50} 419, {b, 10} 420, and {c, 30} 421 then are input at times t1, t2, and t3, respectively. These three stream data are output as ranking information of the top three cases. Next, when {d, 20} 422 is input at time t4, {b, 10} is deleted from the ranking information of the three higher ranked cases because the s.va1 value 20 of {d, 20} is larger than 10 of {b, 10} held so far, the lifetime of {b, 10} ends at t4 (428), and {d, 20} is output as the ranking calculation result. Next, when {e, 40} 423 is input at time t5, {e, 40} is output as the ranking information because the s.va1 value of {e, 40} is 40 and included in the three higher ranked cases. {d, 20}, having the smallest value among the stream data held in the three cases, is deleted from the ranking. However, since {e, 40} 416 is deleted from the window as {e, 15} 417 is input at time t6 as described above, {d, 20} 424 is recovered and included in the three cases and output as the ranking calculation result again. At time t7, {a, 50} 412 is replaced by {a, 45} 418, and {a, 45} 425 is output as the ranking result because the s.va1 value of 45 of {a, 45} is included in the top three cases.

A method of ranking calculation according to a preferred embodiment will be described with reference to FIGS. 2, 9, 10, 18, and 19. The stream tuple reception interface 206 of the ranking processing module 116 receives the stream tuple as difference information (902). The ranking generator 204 then performs buffer maintenance on the ranking information holding buffer 202 (903). The buffer maintenance process will be described using FIGS. 2 and 10. When the stream tuple is received, the ranking generator 204 checks if the sign of the stream tuple is plus or minus (1002). When the sign is plus (when Yes is selected in step 1002), the ranking generator 204 adds the received stream tuple to the ranking information holding table 203 of the ranking information holding buffer 202 (1003), and terminates the process of maintaining a ranking information holding buffer. Adding the stream tuple to the ranking information holding buffer will be described in detail with reference to the flowchart of FIG. 18. When the stream tuple to be added (a stream tuple with a plus sign) is received, the ranking generator checks if the ranking management index 208 is given to the ranking information holding table 203 (1802). The ranking management index may be a B+ tree index or a hash index using a column to be ranked as a key. When the ranking management index exists (when Yes is selected in step 1802), the ranking generator determines a position at which the stream tuple to be added is inserted into the ranking information holding table, using the index (1803). When the index does not exist (when No is selected in step 1802), the ranking generator retrieves the ranking information holding table and determines a position at which the stream tuple to be added is inserted into the ranking information holding table (1804). After determining the insertion position, the ranking generator inserts the stream tuple to be added into the ranking information holding table (1805). When the ranking management index exists (when Yes is selected in step 1806), the ranking generator updates the index and terminates the process of adding a stream tuple to the ranking information holding buffer (1808).

An order relation among the ranked column values of the added stream tuple is held in the ranking information holding buffer according to the preferred embodiment. A reason for holding the order relation in adding the stream tuple is that, with a method of calculating an order relation on demand, it is difficult to output the results immediately, which is required in a real-time processing application, due to delayed processing. For example, in the case of the query 301 of FIG. 3A, since the column to be ranked (the above ranking key) is s.va1, the rank information and the stream tuples are held in descending order of s.va1 in the ranking information holding table 203 of the ranking information holding buffer of FIG. 2.

Returning to FIG. 10, when the sign of the received stream tuple is minus (when No is selected in step 1002 of FIG. 10), the tuple with a plus sign corresponding to the stream tuple is deleted from the ranking information holding buffer 202 (1004), and the ranking information holding buffer maintenance process is terminated.

Figure 19:
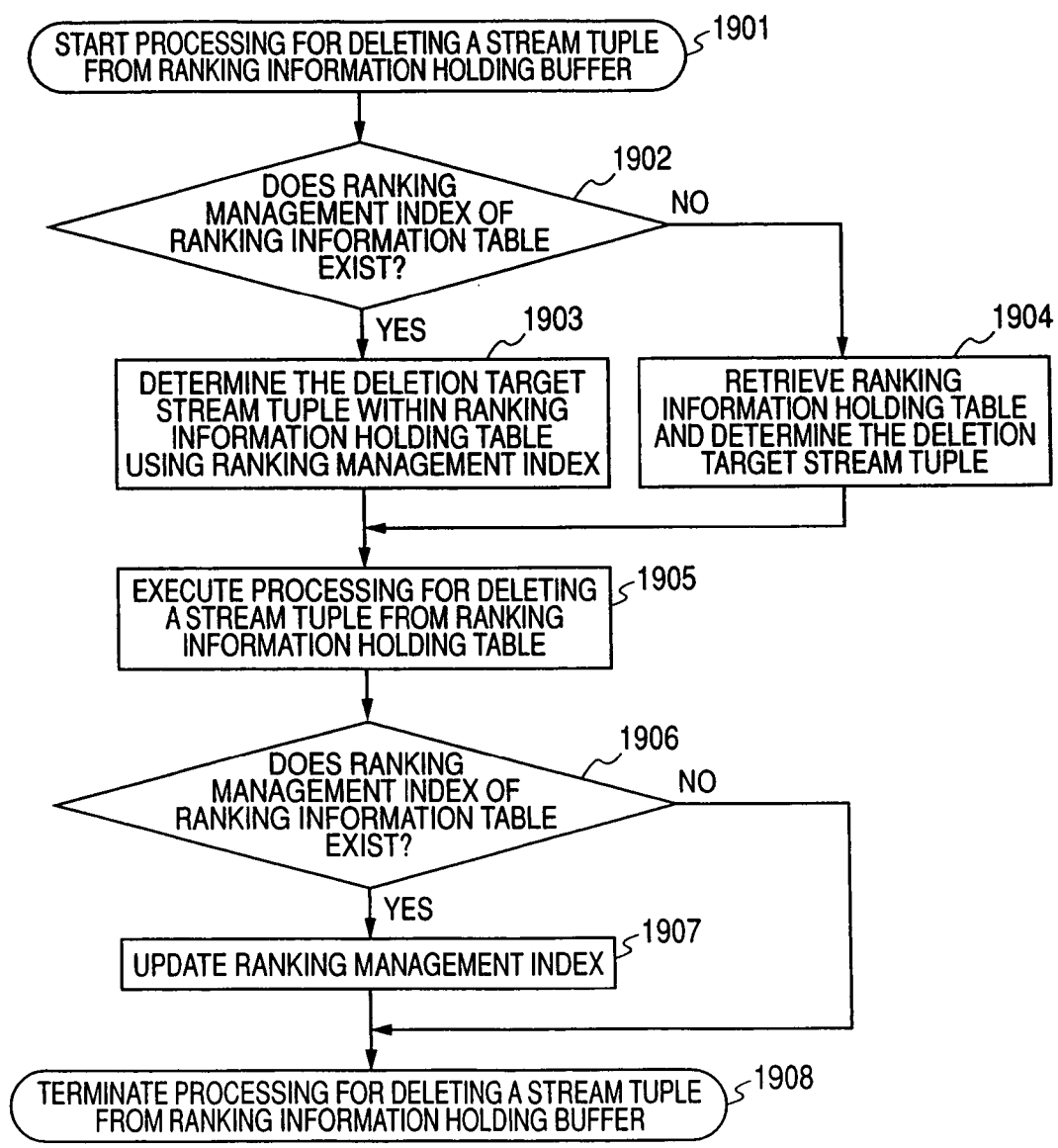
FIG. 19 is a flowchart showing a method of deleting a stream tuple from the ranking information holding buffer in the present invention.

The process of deleting the stream tuple from the ranking information holding buffer will be described in detail with reference to a flowchart of FIG. 19. The ranking generator checks if the ranking management index 208 is given to the ranking information holding table 203 (1902). When the ranking management index exists (when Yes is selected in step 1902), the ranking generator retrieves a stream tuple to be deleted from the ranking information holding table using the index (1903). When the index does not exist (when No is selected in step 1902), the ranking generator retrieves the ranking information holding table to determine a stream tuple to be deleted (1904). When the stream tuple to be deleted is determined, the rank/order generator performs a process of deleting the stream tuple (1905). When the ranking management index exists (when Yes is selected in step 1906), the ranking generator updates the ranking management index and terminates the process of deleting the stream tuple from the ranking information holding buffer.

Figure 14:
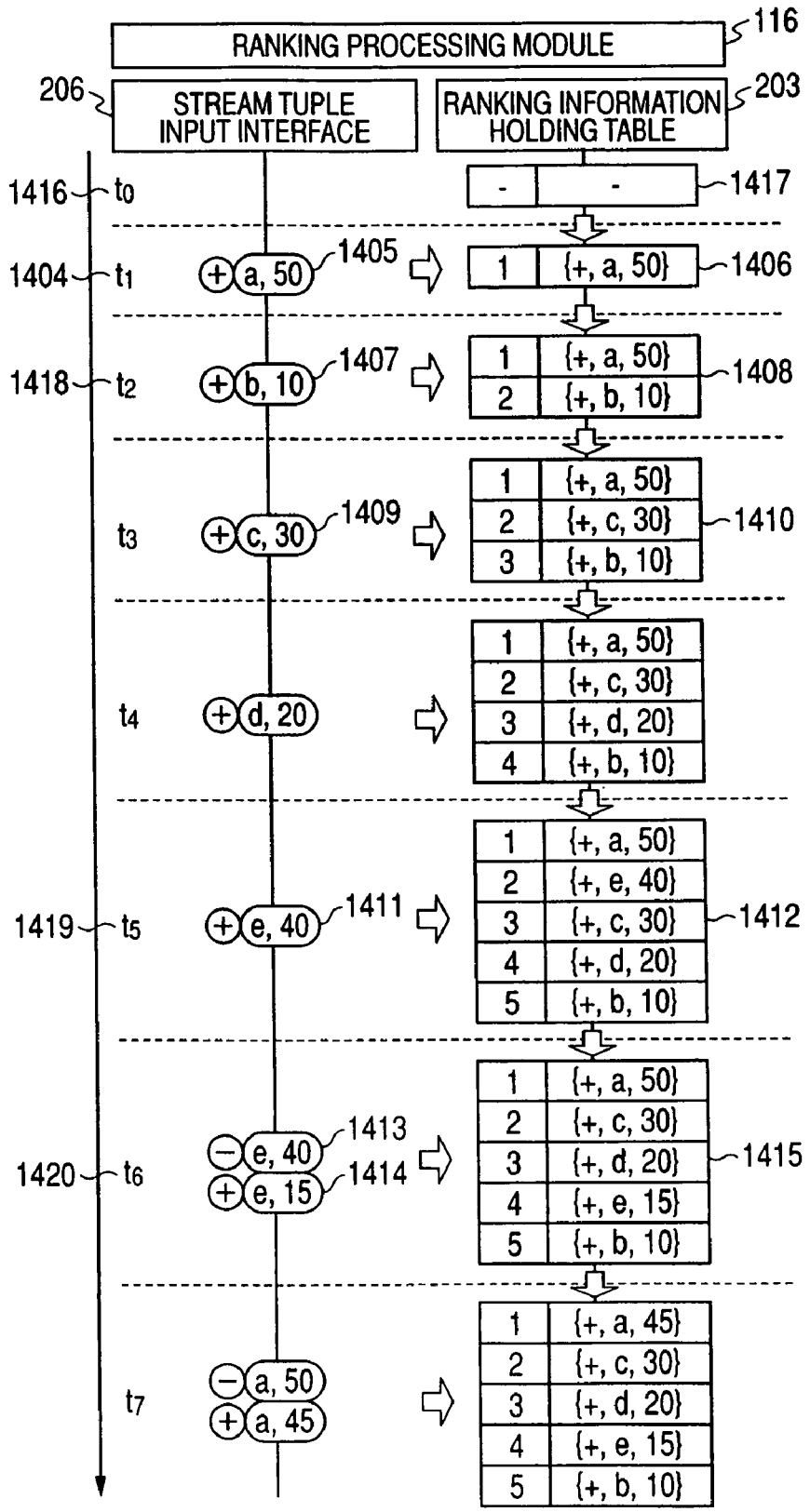
FIG. 14 is a diagram showing an aspect of variation of a ranking information holding table within a ranking information holding buffer in the present invention.

Here, an aspect of variation of ranking information held in the ranking information holding table when a stream arrives in a time chart shown in FIG. 4 at a stream data processing system registering a query of FIG. 3A will be described using FIG. 14. In FIG. 14, t0 1416, t1 1404, and t7 of the left side represent the time, ovals 1405, ..., 1407, and the like to which signs are attached in the center represent differential information (stream tuples to which signs are attached) generated by the window manager, and tables 1417, 1406, . . . , and 1415 of the right side represent ranking information held in the ranking information holding table. For convenience, it is assumed that no ranking information is present at t0 before time t1.

When a stream tuple {a, 50} 1405 having the plus sign arrives at time t1 1404, the stream tuple is registered in the ranking information holding table (1406). Next, when a stream tuple {b, 10} 1407 having the plus sign arrives at time t2 1418, an s.val value 10 of its ranked target is compared with an s.val value 50 of the stream tuple held in the ranking information holding table, an insertion position is determined to be next to {a, 50} 1405, and the stream tuple {b, 10} is inserted at the insertion position (1408). Likewise, when {c, 30}, {d, 20}, and {e, 40} respectively arrive at t3, t4, and t5, their stream tuples are sorted and registered in order of s.val values of ranked targets.

Figures 2, 3A, 3B:
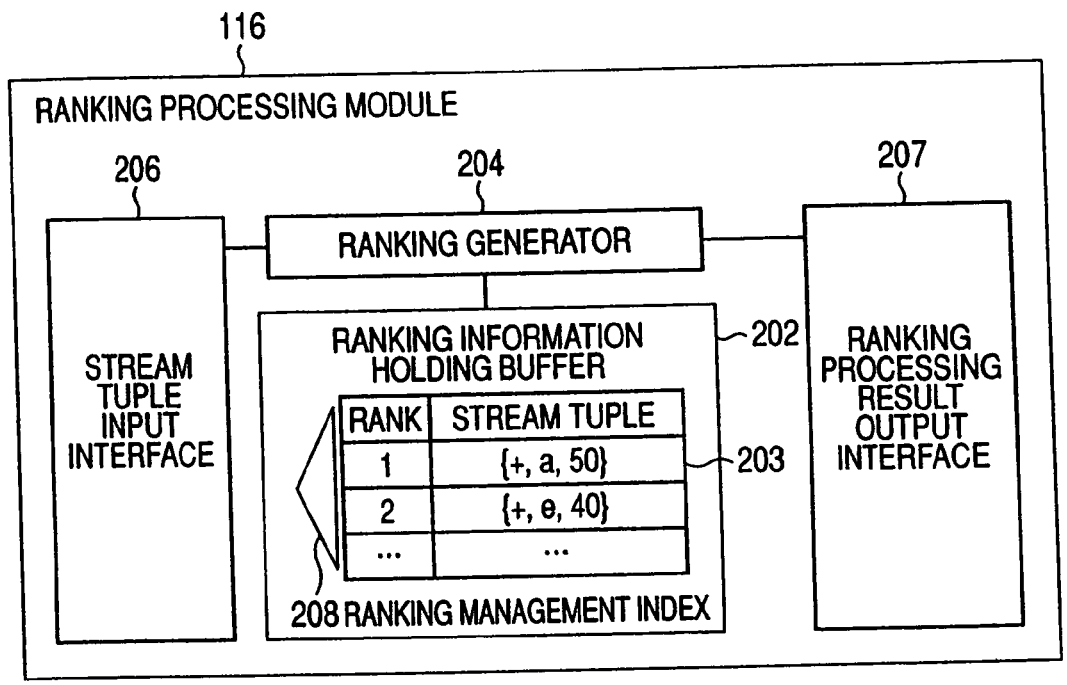
FIG. 2 is a diagram showing a structure of a ranking processing module in the present invention.
FIGS. 3A and 3B are an example of a query including a ranking designation (excluding a rank output designation) in the present invention.

As shown in FIG. 4, when {e, 15} 408 arrives at time t6, {e, 40} is deleted from the window in a Row window query of a one-row designation shown in FIG. 3A (433). Thus, a stream tuple {e, 40} 1413 to which the minus sign is attached and a stream tuple {e, 15} 1414 to which the plus sign is attached arrive at the stream tuple reception interface 206 of the ranking processing module 116 shown in FIG. 14. The ranking generator 204 retrieves and determines a stream tuple to which the plus sign is attached corresponding to the stream tuple {e, 40} to which the minus sign is attached, and deletes the stream tuple (the second from the top of 1412). An insertion position of a new stream tuple {e, 15} 1414 (the fourth from the top of 1415) to which the plus sign is attached is determined and the stream tuple is added to the ranking information holding table. The same is true at time t7 also.

Figures 11, 12, 13:
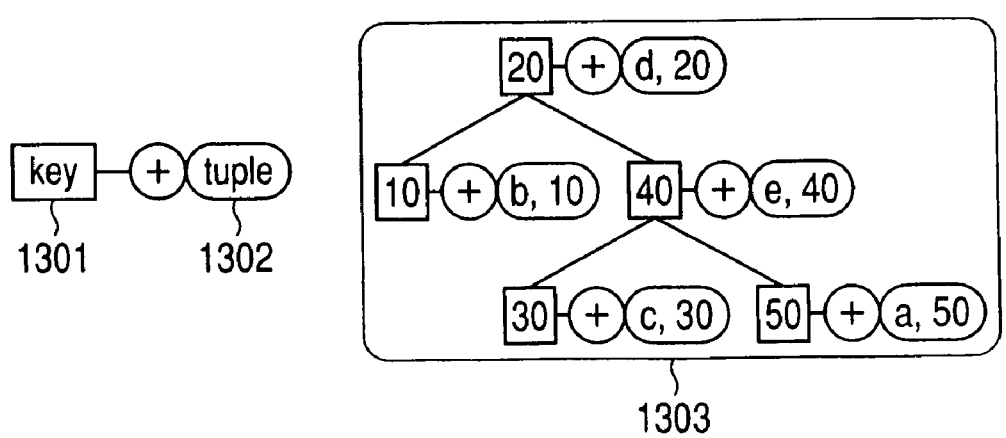
FIG. 11 is an example of a query including a ranking designation (including an offset designation) in the present invention.
FIG. 12 is a query description example according to a query processing language (CQL)
FIG. 13 is an example of expression by a binary search tree of ranking information in the present invention.

Although, in this embodiment, the data structure of the ranking information holding buffer is in the form of a table, another preferred implementation example of the data structure of the ranking information holding buffer may include a binary search tree having a ranking key as a node, as shown in FIG. 13. In FIG. 13, the node (ranking key) of the binary search tree is shown in a rectangle 1301 and a data body (stream tuple) pointed from the node is shown in a set 1302 of a circle and an oval. When the binary search tree is used, the ranking key as the node is set. The tree is configured such that ranking key values of a child of the left side of a certain node and all descendant nodes thereof are smaller than a ranking key value of the certain node, and values of a child of the right side of the certain node and all descendant nodes thereof are equal to or larger than the ranking key value of the certain node. The binary search tree within a rounded rectangle 1303 of FIG. 13 is an example of a structure of a binary search tree of data held by the ranking information holding buffer at time t5 of FIG. 4. Content of the held data is the same as in a ranking information holding table 1412 of FIG. 14. When the plus tuple and the minus tuple arrive, an order relation can be efficiently managed by managing the order based on a ranking key using the binary search tree. As another preferred data structure for holding and managing the order relation of stream tuples, a B+ tree used in many DBMS data management mechanisms can be used.

The ranking information holding buffer needs to hold all stream tuples corresponding to stream data during the lifetime as well as the number of ranking output cases designated by the user. For example, an indication is received from the user to output the top three cases in a query 301 of FIG. 3A. However, when a sequence of stream data shown in FIG. 4 arrives at the system and {d, 20} 408 arrives at time t4, a stream tuple 433 corresponding to a stream data {b, 10} 406 whose rank is fourth should not be deleted from the ranking information holding buffer. This is because the ranking changes, even when the lifetime of stream data ends in addition to the case where new stream data arrives at the system during stream data processing, and stream data that is outside of a current, user-designated range needs to be re-output as ranking results by the end of the lifetime of other stream data. For example, when time t4 is reached in FIG. 4, stream data {d, 20} 408 included in the top three cases is extracted outside the ranking by the arrival of {e, 40} 409 at time t5, but {d, 20} needs to be again included in ranking calculation results (424) since {e, 40} is deleted from the window by the arrival of {e, 15} 410 at time t6 (433). That is, the ranking information holding buffer needs to hold all stream tuples corresponding to stream data managed in the window, that is, all stream tuples corresponding to stream data during the lifetime.

In this regard, if there is a special condition of an application that a stream tuple is not ranked when the stream tuple is not included in the top 50 upon arrival thereof, the number of stream tuples held in the ranking information holding buffer can change according to the condition of the application.

Returning to FIG. 9, the ranking generator checks whether or not processing results affect the ranking on the basis of results of buffer maintenance processing (903) of a received stream tuple (904). If the processing results affect the ranking, it indicates a change in an order of a range designated by the query in the maintenance results of the ranking information holding buffer based on the received stream tuple. For example, since an output range of the top three cases is designated in the query 301 of FIG. 3A, the determination as to whether or not the processing results affect the ranking (step 904) becomes Yes. For example, the case of processing shown in FIG. 4 is an example of Yes since a ranking change is made in the top three when {d, 20} arrives at time t4. When the processing results affect the ranking (when Yes is selected in step 904), it is checked whether or not a rank information output is designated (905). When the rank information output is designated (when Yes is selected in step 905), a rank information column is added to processing result tuples (906), the processing result tuples are output (907), and the ranking processing is terminated (908). When the rank information output is not designated (when No is selected in step 905), the processing result tuples are output (907) and the ranking processing is terminated (908).

Figure 5A:
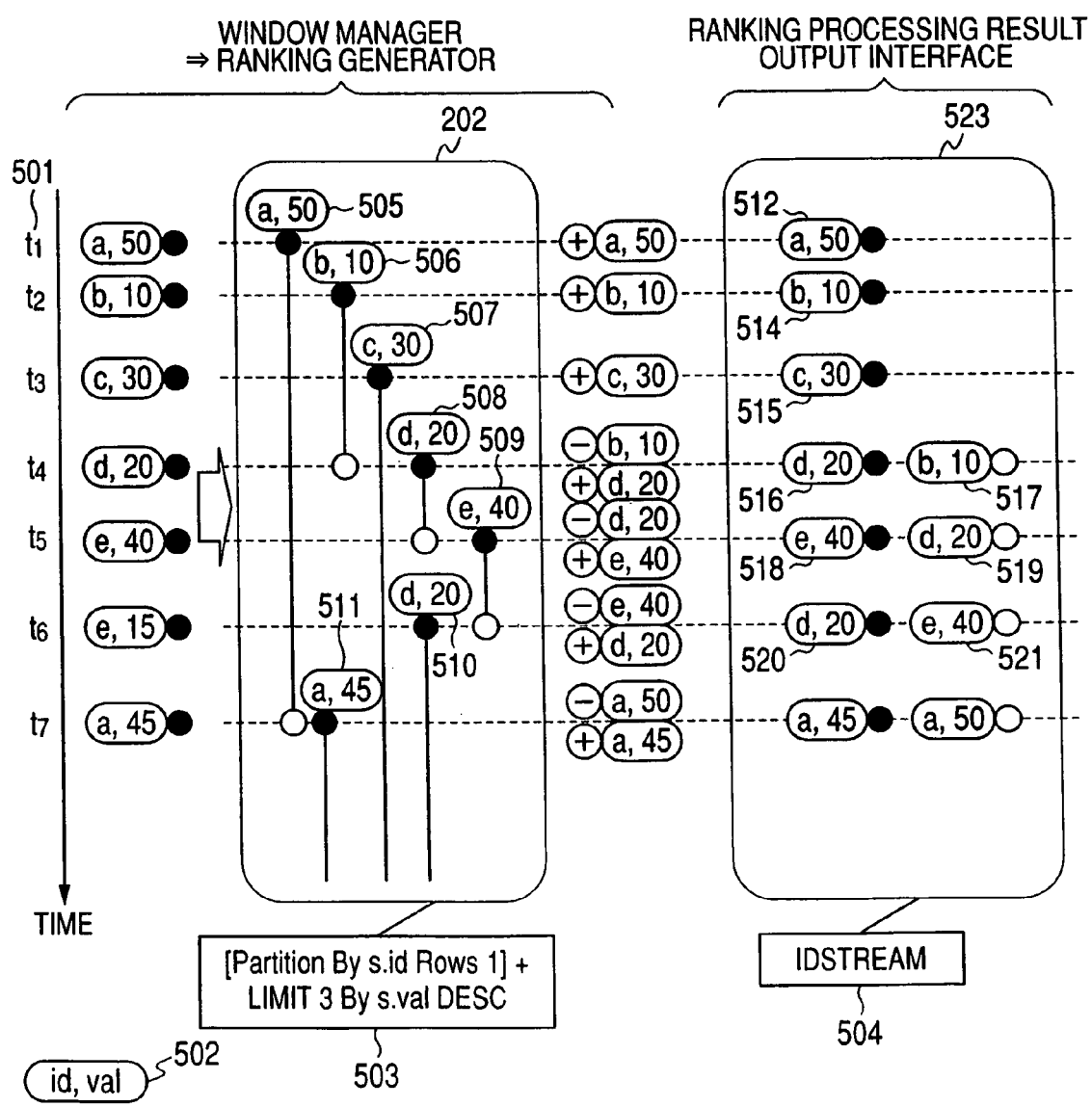
FIGS. 5A and 5B are a diagram showing output ranking calculation results (excluding a rank output designation) in the present invention.

Since the rank information output is not designated in the case of the query 301 of FIG. 3A, the processing result tuples output from the ranking processing result output interface are shown, for example, as indicated by 523 of FIG. 5A, and rank information is not added. An example when the rank information output is designated (when Yes is selected in step 905) will be described.

Since useful information needs to be instantly extracted from huge amounts of information in the real-time application ranking calculation as described above, efficient processing is needed. Thus, the stream data processing system of this embodiment has an output interface of differential information in a ranking change and an output interface of all information within the ranking at its time. Reference number 202 at the center of FIG. 5A indicates a window calculation "[Partition By s.id Rows 1]" of the query 301 (FIG. 3A) described with reference to FIG. 4, and a state at each time the ranking information holding buffer stores processing results of a ranking calculation designation phrase "LIMIT 3 By s.val DESC". In the query 301, an IDSTREAM phrase is designated as the final output format. The IDSTREAM phrase is an interface outputting a tuple added to the ranking as an incremented tuple and a tuple deleted from the ranking as a decremented tuple in ranking calculation results. In FIG. 5A, stream data processed by the IDSTREAM phrase 504 is shown in a rounded rectangle 523 at the right side of the figure. In this regard, a black circle of the stream data indicates an increment and a white circle indicates a decrement. Hereinafter, processing of content of the IDSTREAM phrase will be described. Since {a, 50} 505 is added to the ranking at time t1, {a, 50} 512 is output as incremented stream data of processing results in the IDSTREAM phrase. Next, since {b, 10} 506 and {c, 30} 507 are added to the ranking at times t2 and t3, {b, 10} 514 and {c, 30} 515 are output as the increment. At time t4, {d, 20} 508 is inserted into the ranking and {b, 10} 506 is deleted from the ranking. In this case, in the IDSTREAM phrase, at time t4, {d, 20} 516 is output as the increment and {b, 10} 517 is output as the decrement. The processing cost and the communication cost can be reduced by calculating only the increment and decrement information and transmitting to the client computer using the information. For example, in the case of FIG. 5A, 11 processing results are transmitted to the client computer between t1 and t7, but, when all results of the top n cases at each timing are transmitted, (n×7) processing results need to be transmitted. In particular, when n is large, the effect of the present invention, which transmits differential information only, is remarkable.

Figure 5B:
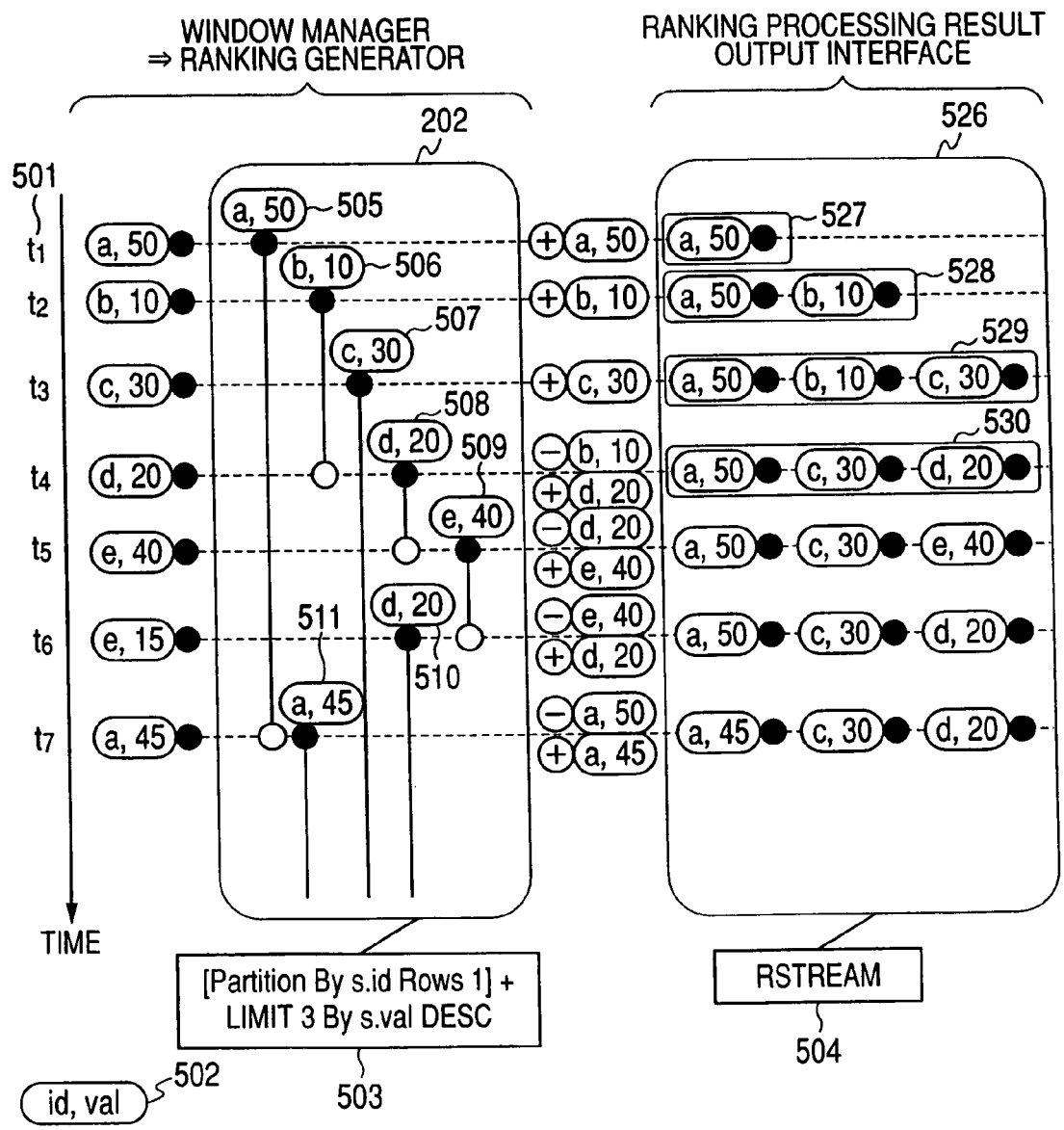

In this regard, when the client computer side needs to continuously provide the user with ranking information as needed, the client computer side needs to continuously create all ranking information from the differential information. In this processing, since the client computer side needs to manage a state, implementation may be difficult depending on a client computer state and a type of real-time application. In order for the ranking information to be available in this situation, the stream data processing system of this application has an interface that generates and outputs all ranking information from the generated differential ranking information. A query 302 of FIG. 3B is the same as the query 301 except for an RSTREAM phrase of the first row. A SELECT phrase of the first row designates a set of s.id and s.val values as an output target, a FROM phrase of the second row designates a stream s as a target, a Partition By phrase of the same second row designates that grouping is made in s.id values and one last case of each s.val value is held, and a LIMIT phrase of the third row designates that three cases are output in descending order of s.val value. The IDSTREAM phrase of the first row of the query 301 means that only the differential information relative to the previous output is output, whereas the RSTREAM phrase of the first row of the query 302 means that ranking information of all stream tuples in an output designation range is output every output time. FIG. 5B shows ranking calculation output results of the interface. Each time state of the ranking information holding buffer 202 of FIG. 5B is the same as that of FIG. 5A. After the LIMIT phrase is processed, a result of applying the RSTREAM phrase of the query 302 shown in FIG. 3B becomes stream data shown in a rounded rectangle 526 at the right side of FIG. 5B. Hereinafter, an output format of ranking calculation results will be described using FIG. 5B. Since {a, 50} 505 is added to the ranking at time t1, {a, 50} 527 is output in the RSTREAM phrase. Next, when {b, 10} 506 is added to the ranking at time t2, the RSTREAM phrase outputs all rankings, that is, two stream data {a, 50} and {b, 10} (528). Next, when {c, 30} 507 is added to the ranking at time t3, {c, 30} is output in addition to {a, 50} and {b, 10} (529). Next, at time t4, {d, 20} 508 is inserted into the ranking and {b, 10} 506 is deleted from the ranking. In this case, in the RSTREAM phrase, {a, 50}, {c, 30}, and {d, 20} are output at time t4 (530). When processing results are output to implement this processing, the ranking processing result output interface 207 can hold output content upon previous output and generate output information by combining the output content and ranking information newly generated by the ranking generator 204. In the description of this time, the output timing of the RSTREAM phrase is a moment at which input stream data arrives, but, for example, can be every given time interval of 1 sec or the like, every n input tuples, or every m output tuples, so as to reduce output generation load and communication cost.

Next, an example in which a rank information output is designated in the query (when Yes is selected in step 905 of FIG. 9) will be described using queries 601 and 602 of FIG. 6. In the query 601, an additional output of rank information at its time is designated by a RANKING AS rank designation of the first row, in addition to s.id and s.val output in the query 301. Only differential information after the previous output is output in the query 601, whereas all ranking information is output every time in the query 602.

Figure 7:
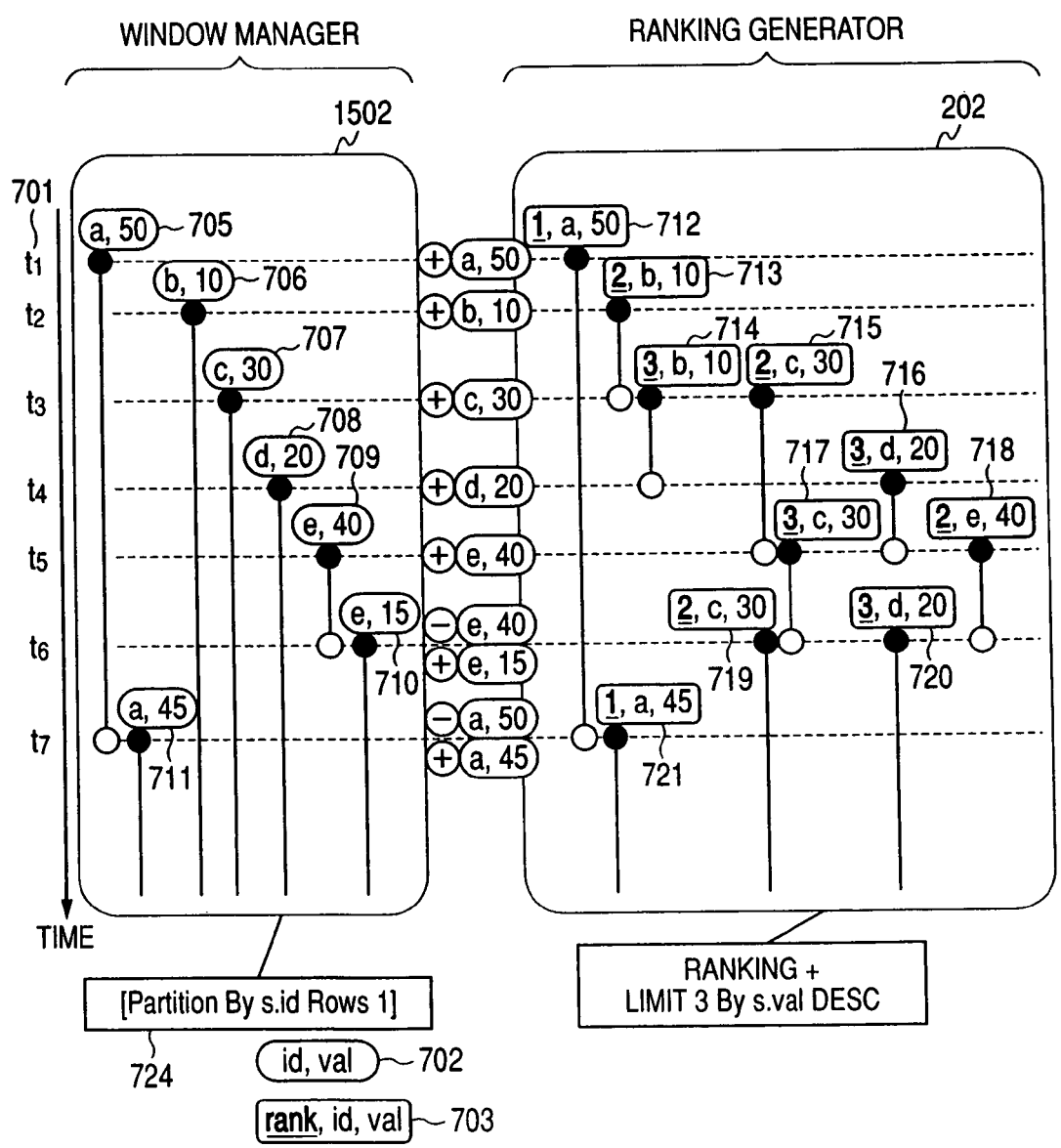
FIG. 7 is a diagram showing content of a ranking calculation (including a rank output designation) in the present invention.

First, a ranking calculation method when the rank information output designation is included will be described with reference to FIG. 7. A rounded rectangle 1502 at the left side of FIG. 7 shows a state at each time the stream tuple holding buffer stores processing results of a window calculation "[Partition By s.id Rows 1]", and is the same as shown in FIG. 4. The ranking calculation method including the rank information output designation will be described for each time state. As shown in an example 702 of FIG. 7, a set of two values surrounded by an oval represents stream data of the format {id, val}. As shown in an example 703, a set of three values surrounded by a rounded rectangle represents stream data of the format {rank, id, val}. Here, the rank is based on a val value at an output time.

Figure 9:
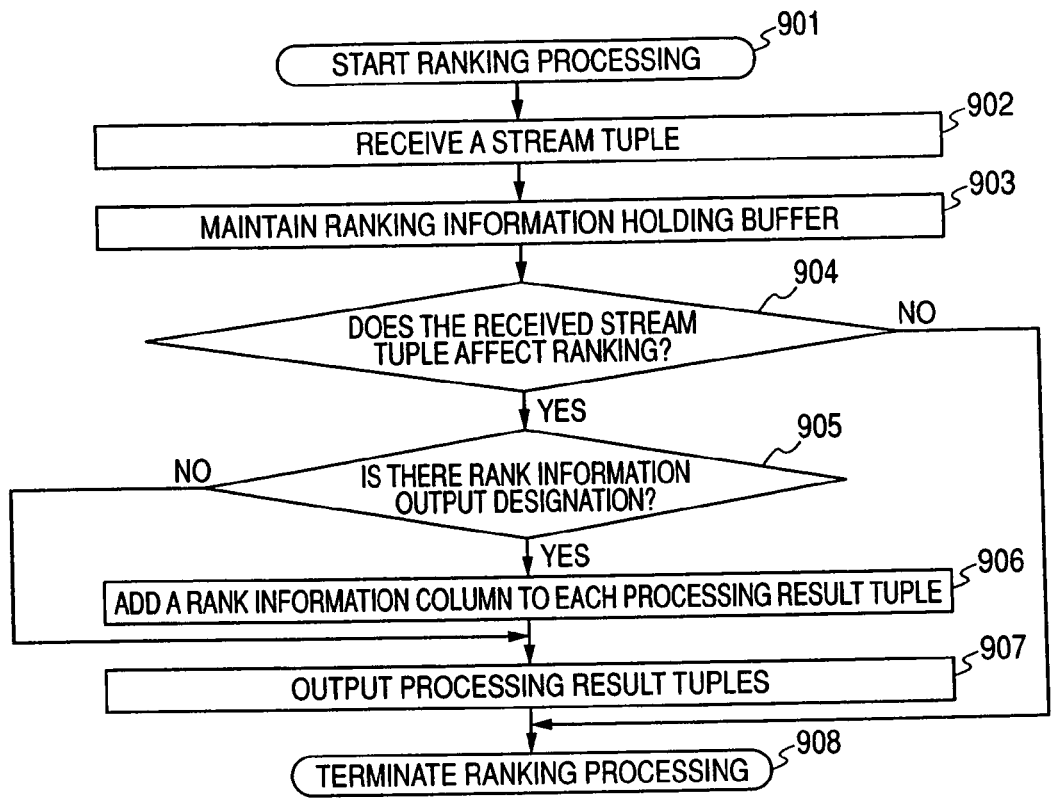
FIG. 9 is a flowchart showing a ranking processing procedure in the present invention.
Figure 10:
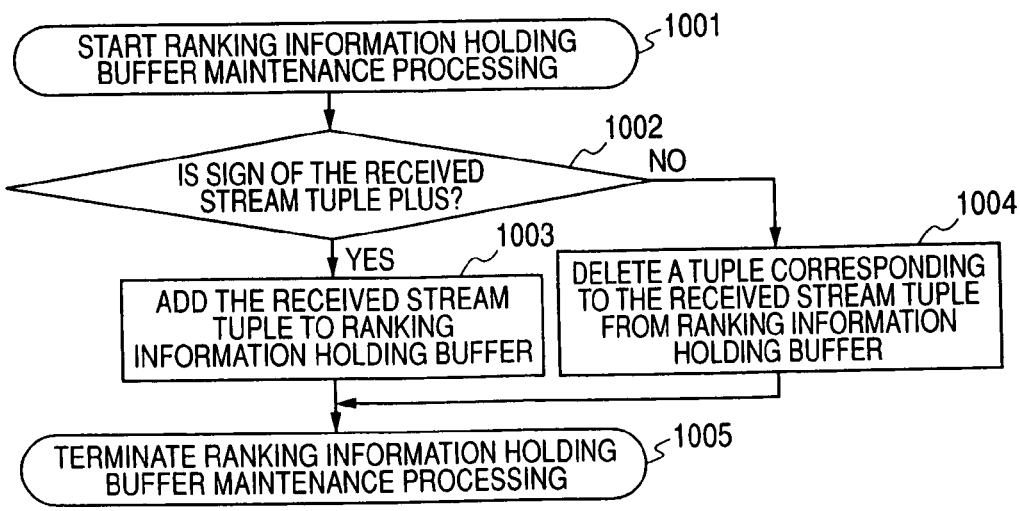
FIG. 10 is a flowchart showing a ranking information holding buffer maintenance processing procedure in the present invention.

When {a, 50} 705 arrives in stream data at time t1, this stream tuple is included in the ranking and its rank is first, such that the ranking calculation result becomes {1, a, 50} 712. Next, when stream data {b, 10} 706 arrives at time t2, {2, b, 10} 713 is output since this stream data is also included in the ranking. When {c, 30} 707 arrives at time t3, its rank is second since this stream data is also included in the ranking and its val value 30 is larger than that of {b, 10}, and simultaneously the rank of {b, 10} is third. Thus, {2, b, 10} is deleted from the ranking calculation results and {3, b, 10} 714 and {2, c, 30} 715 are added. Continuously, when stream data {d, 20} 708 arrives at time t4, its val value 20 is larger than the val value 10 of {b, 10}, such that {3, b, 10} is deleted from the ranking calculation results and {3, d, 20} 716 is added to the calculation results. Next, when stream data {e, 40} 709 arrives at time t5, its val value 40 is larger than those of {c, 30} and {d, 20} and its rank is second, such that {2, e, 40} 718 is included in the ranking calculation results. Simultaneously, {3, d, 20} is deleted from the ranking calculation results and the rank of {c, 30} changes from second to third, such that {2, c, 30} is deleted and {3, c, 30} 717 is added. The same is true in the case where {e, 15} 710 and {a, 45} 711 respectively arrive at times t6 and t7. The ranking calculation processing is executed in the ranking generator 204 of FIG. 2 and the ranking calculation processing results at each time are stored in the ranking information holding buffer 202. In a preferred embodiment of a calculation method, steps up to ranking information holding buffer maintenance (903) in the flowchart of FIG. 9 are the same. Next, it is checked whether or not a rank information output is designated (905). When the rank information output is designated (when Yes is selected in 905), rank information column addition processing of a processing result tuple is performed (906). The rank information addition processing uses the ranking information processing buffer 202. In the preferred embodiment described above, the ranking information holding buffer holds an added stream tuple while managing an order relation of column values to which rank information attachment is designated. For example, since a column as an ordered target is s.val in the case of the query 601 like the case of the query 301, an implementation method can include the format of the table 203 of FIG. 2 or the binary search tree of FIG. 13 having a value of s.val as a key for a data structure of the ranking information holding buffer. In the rank information addition processing, when s.val is set as a key, a sequence number of a stream column of a rank information addition target is calculated and the rank is added to a position of a column designated in the query. For example, in the case of the query 601, the rank information is included and output in the first column since "RANKING AS rank" is designated in the first column of the SELECT phrase.

Figure 8A:
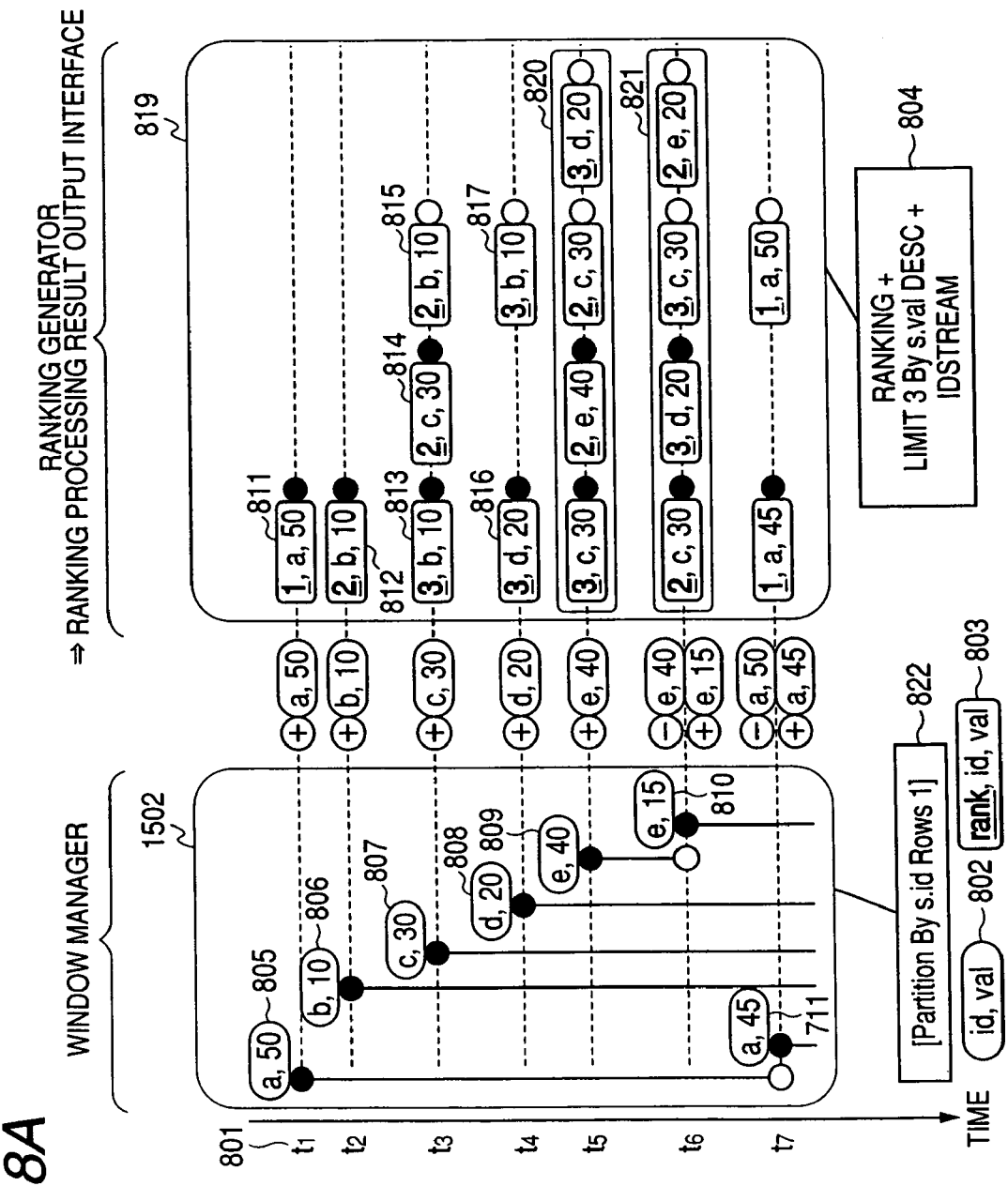
FIGS. 8A and 8B are a diagram showing output ranking calculation results (including a rank output designation) in the present invention.
Figure 8B:
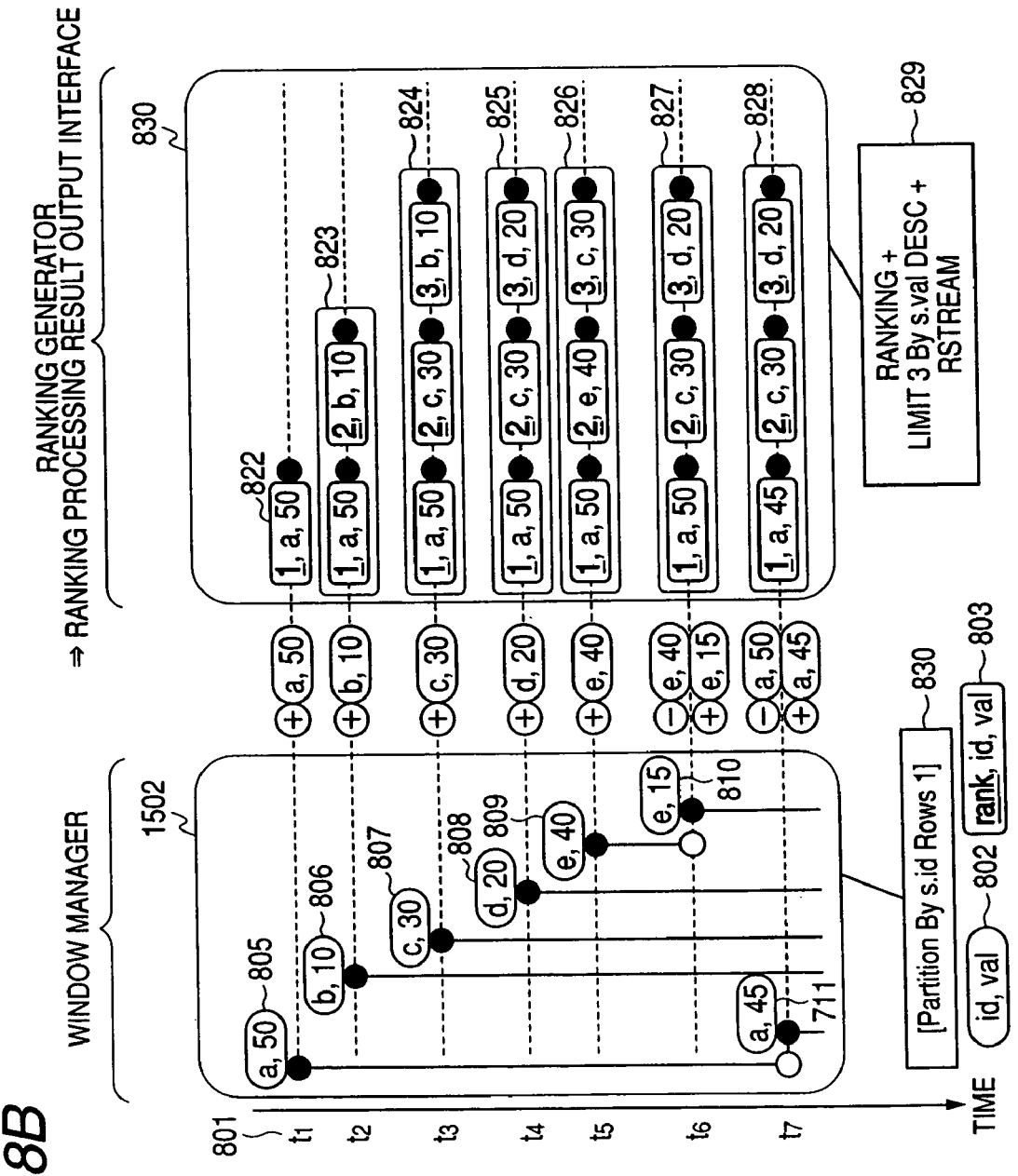

In the query 601, the IDSTREAM phrase is designated as the final output format. As described using the query 301, the IDSTREAM phrase is an interface outputting stream data added to the ranking as the increment, and outputting stream data deleted from the ranking as the decrement, in ranking calculation results. In FIG. 8A, stream data after processing by an IDSTREAM phrase 804 is indicated at the right side (819) of the figure. When {a, 50} 805 arrives at time t1, rank information calculated by the ranking generator is output by adding it to the first column designated in the query at the beginning of an output column. When {a, 50} arrives, only one stream data element is present and its rank is first, such that {1, a, 50} 811 is output. Next, when {b, 10} 806 arrives at time t2, its rank is second and hence {2, b, 10} 812 is output. When {c, 30} 807 arrives at time t3, its rank is second since its val value 30 is smaller than a val value 50 of {a, 50} and is larger than a val value 10 of {b, 10}. Thus, at time t3, {3, b, 10} 813 and {2, c, 30} 814 are output as the increment and {2, b, 10} 815 is output as the decrement. In an example of the query 301 shown in FIG. 5A, since a set itself included in a ranking output according to {c, 30} does not change, only {c, 30} is output as the increment (515). In an example of the query 601 of FIG. 8A, since the rank is changed by the arrival of {c, 30}, three stream data are output by adding the increment and the decrement. Likewise, four stream data as indicated by 820 and 821 correspond to a rank change at times t5 and t6, and the number of stream tuples is larger than in the query 301. Since the above-described IDSTREAM phrase is designated as the final output format in the query 601, the incremented/decremented stream data is output. But, even when the ranking output designation is present, a request can be made to output all rankings at each moment as in the case where the ranking output designation is absent. This example is the query 602. By designating RSTREAM 829 in place of IDSTREAM of the query 601, all ranking calculation results are output at an output time. FIG. 8B shows execution results of the query 602. Outputs at time t1 to t7 are indicated by 822 to 828.

Although the ranking designation is in descending order and its starting rank indicates only the top rank in the above-described embodiment, the ranking designation may be in ascending order. The ranking starting rank can be designated as an arbitrary integer. For example, a query 1101 of FIG. 11 indicates that the last one of each s.val value is held by grouping a set of s.id and s.val values from a stream s in the s.id value, and three cases are output in ascending order of s.val value from the tenth place as the starting rank. A difference from the query 301 of FIG. 3A is OFFSET phrase and ASC designations of the third row, wherein the former is the designation of the starting rank and the designation of the ascending order. When there is an OFFSET designation, it can be checked whether or not a tuple undergoing the ranking processing of FIG. 9 affect the ranking (904) by checking whether or not the stream tuple affect an output designation range designated in a LIMIT phrase from the starting rank designated in the OFFSET designation. The holding and management of the ranking information can be processed in the ranking processing module 116 shown in FIG. 2 as in the case where the OFFSET designation is absent.

Although the ranked target column is explicitly input to the system in the above-described embodiment, the present invention may be applied to a system that automatically determines a ranked target column.

What is claimed is:

1. A ranking query processing method for stream data that receives stream data as a plurality of continually arriving stream tuples to which timestamps are attached and continually executes query processing on the stream data based on a pre-registered query, the method comprising:
   determining a lifetime, in a window, of each arriving stream tuple in response to arrival of the stream tuple, and determining an end of a lifetime, in the window, of each previously arrived stream tuple in addition thereto according to a window designation by the query;
   generating window differential information indicating insertion of a stream tuple into the window and deletion of a stream tuple from the window at each time;
   using the window differential information and archived information to compute a ranking, in the window, concerning an ordered target item between stream tuples that are within the window including stream tuples for which the ranking is outside of an output designation range designated by the query each time a lifetime of a stream tuple starts and each time a lifetime of a stream tuple ends according to ranking processing by the query, and updating a ranking information that indicates the ranking according to the computed ranking;
   outputting a stream tuple set of stored stream tuples for which the raking is included in the output designation range designated by the query;
   storing the updated ranking information of the stream tuples that are within the window and are present within a lifetime in the window for which the ranking is outside of the output designation range in a ranking information holding buffer that archives the ranking information; and
   storing the stream tuples that are within the window and includes tuples for which the ranking is outside of the output designation range.

2. The ranking query processing method for stream data according to claim 1, wherein storing of the ranking information is performed for all stream tuples present within the lifetime.

3. The ranking query processing method for stream data according to claim 1, wherein the ranking information is stored as a table in which each stream tuple and the ranking thereof are mapped within the ranking information holding buffer.

4. The ranking query processing method for stream data according to claim 1, wherein when a ranking information output is designated in the query, the ranking information is output by adding the rankings of the stream tuples to the stream tuples included in the output designation range.

5. The ranking query processing method for stream data according to claim 1, wherein when the ranking information is output, differential information relative to a previous output is generated.

6. The ranking query processing method for stream data according to claim 1, wherein when the ranking information is output, all ranking information is output.

7. The ranking query processing method for stream data according to claim 1, further comprising:
adding, when a stream tuple has arrived, a sign indicating a start of a lifetime to the stream tuple, and adding, when an end of a lifetime of a stream tuple has been determined, another sign indicating the end of the lifetime to the stream tuple, wherein the ranking information is updated using a signed stream tuple.

8. A non-transitory computer-usable storage medium having computer readable instructions stored thereon for execution by a processor to implement a stream data processing system that receives stream data as a plurality of continually arriving stream tuples to which timestamps are attached and continually executes query processing on the stream data based on a pre-registered query, the system comprising:
a window manager that executes a window calculation designated in the query for each arrived stream tuple and determines a lifetime in a window of each stream tuple; and
a ranking processing module that performs ranking processing to compute a ranking between stream tuples in the window including stream tuples for which the ranking is outside of an output designation range designated in the query, outputs a stream tuple set of stored stream tuples for which the ranking is included in the output designation range designated by the query, and stores the stream tuples that are within the window and include tuples for which the ranking is outside of the output designation range,
wherein the window manager includes:
a differential information generator that generates window differential information indicating insertion of a stream tuple into the window and deletion of a stream tuple from the window at each time, and delivers the window differential information to the ranking processing module, and
wherein the ranking processing module includes:
a ranking generator that generates/updates ranking information in a range of stream tuples present in a lifetime in the window from the window differential information delivered by the differential information generator of the window manager and archived information; and
a ranking information holding buffer that archives the ranking information updated by the ranking generator in the range of stream tuples present in the lifetime in the window.

9. The non-transitory computer-readable storage medium according to claim 8, wherein the ranking information holding buffer holds the ranking information as a table in which each stream tuple and the ranking thereof are mapped.

10. The non-transitory computer-readable storage medium according to claim 9, wherein the differential information generator adds, when a stream tuple has arrived, a sign indicating insertion into the window to the stream tuple, adds, at an end time of a lifetime of a determined stream tuple, another sign indicating deletion of the stream tuple from the window, and delivers each sign to the ranking processing module as the window differential information.

11. The ranking query processing method for stream data according to claim 1, wherein the output designation range designated by the query specifies an arbitrary place in the ranking as a starting rank for the output designation range.

12. The non-transitory computer-usable storage medium according to claim 9, wherein the output designation range designated by the query specifies an arbitrary place in the ranking as a starting rank for the output designation range.

* * * * *